(12) United States Patent  
Houlberg

(10) Patent No.: US 7,847,724 B1  
(45) Date of Patent: Dec. 7, 2010

(54) RADAR VIDEO DATA PLAYER

(75) Inventor: Christian L. Houlberg, Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 31 days.

(21) Appl. No.: 12/410,629

(22) Filed: Mar. 25, 2009

(51) Int. Cl.
*G01S 7/28* (2006.01)
(52) U.S. Cl. .......................... 342/197; 342/62; 342/182
(58) Field of Classification Search ................ 342/197, 342/195, 62, 176, 182
See application file for complete search history.

(56) References Cited

U.S. PATENT DOCUMENTS

| | | | |
|---|---|---|---|
| 3,735,411 A * | 5/1973 | Whitnah et al. ............. 342/138 |
| 4,649,390 A * | 3/1987 | Andrews et al. ............. 342/140 |
| 5,917,442 A * | 6/1999 | Manoogian .................. 342/62 |
| 6,177,904 B1 * | 1/2001 | Coenen et al. ................ 342/62 |
| 6,633,613 B1 * | 10/2003 | Houlberg ............... 375/240.26 |
| 7,425,919 B2 * | 9/2008 | Houlberg .................... 342/197 |
| 7,626,535 B2 * | 12/2009 | Ding et al. .................... 342/95 |
| 2008/0191931 A1 * | 8/2008 | Houlberg .................... 342/185 |
| 2008/0212773 A1 * | 9/2008 | Houlberg .................... 380/200 |

* cited by examiner

*Primary Examiner*—John B Sotomayor
(74) *Attorney, Agent, or Firm*—David S. Kalmbaugh

(57) ABSTRACT

A computer software program which plots radar video data on a display screen for viewing by a user in a format that emulates a real display. The radar video data the program plots on the display screen is either recorded radar video data generated by a missile radar video seeker or telemetered radar video data generated by the radar video seeker. The display screen display multiple radar scans of video data in the form of a graph or plot on the display screen.

20 Claims, 17 Drawing Sheets

RADAR VIDEO DATA PLAYER

BACKGROUND OF THE INVENTION

1. Field of the Invention

The present invention relates generally to viewing radar video data provided by a missile radar video seeker. More specifically, the present invention relates to a computer software program which displays recorded radar video data in a graphical form depicting a plurality of radar scans.

2. Description of the Prior Art

There is currently a need to play back recorded radar video data obtained from a missile seeker in a graphical form depicting a plurality of radar scans. There is also a need for the display of the radar video data to appear like a display viewed by an oscilloscope with probes connected directly to the radar video signals output by the missile seeker. The signals encoded by the radar video data include a master trigger, radar video and a detection gate.

In the past, the device used to view the radar video data obtained from a missile radar seeker in a graphical form comprised a radar video data viewer of the type disclosed in U.S. Pat. No. 7,425,919 entitled Radar Video Data Viewer which issued to Christian L. Houlberg on Sep. 16, 2008. The viewer described in U.S. Pat. No. 7,425,919 is based upon Microsoft Corporation's Excel program and is only capable of statistically displaying individual radar scans recorded in a radar video data format onboard the platform carrying the seeker. In addition the viewer of U.S. Pat. No. 7,425,919 requires that the data be in an ASCII form and limited to files of approximately 55 megabytes in size which severely limits its usefulness. As a comparison, the original binary data, recorded in the platform's onboard telemeter radar video data format is contained in a file that is approximately four gigabytes in size.

There is a requirement to play back radar video data acquired from a seeker over a time period spanning from four minutes up to twenty minutes which covers the time period for a platform to a target. For example, a four minute file is approximately four Gigabytes and twenty minute file is approximately twenty Gigabytes.

SUMMARY OF THE INVENTION

The radar video data player described herein overcomes some of the disadvantages of the past including those mentioned above in that it comprises a computer software program which is highly effective and efficient at allowing a user to directly play back original binary data, recorded in the platform's onboard telemeter video format to be viewed in a manner that emulates a real time display obtained directly from the radar seeker. In addition, the radar video data player is capable of directly playing back recorded data in a telemetered radar video data format obtained from telemetered data provided during the test flight of a radar seeker. Furthermore, the radar video data player is capable of fast forwarding the playback of the recorded data and display the data in reverse, as well as providing for pauses during the display, and single stepping through the individual recorded scans in either a forward or a reverse direction.

DETAILED DESCRIPTION OF THE PREFERRED EMBODIMENTS

Figure 1:
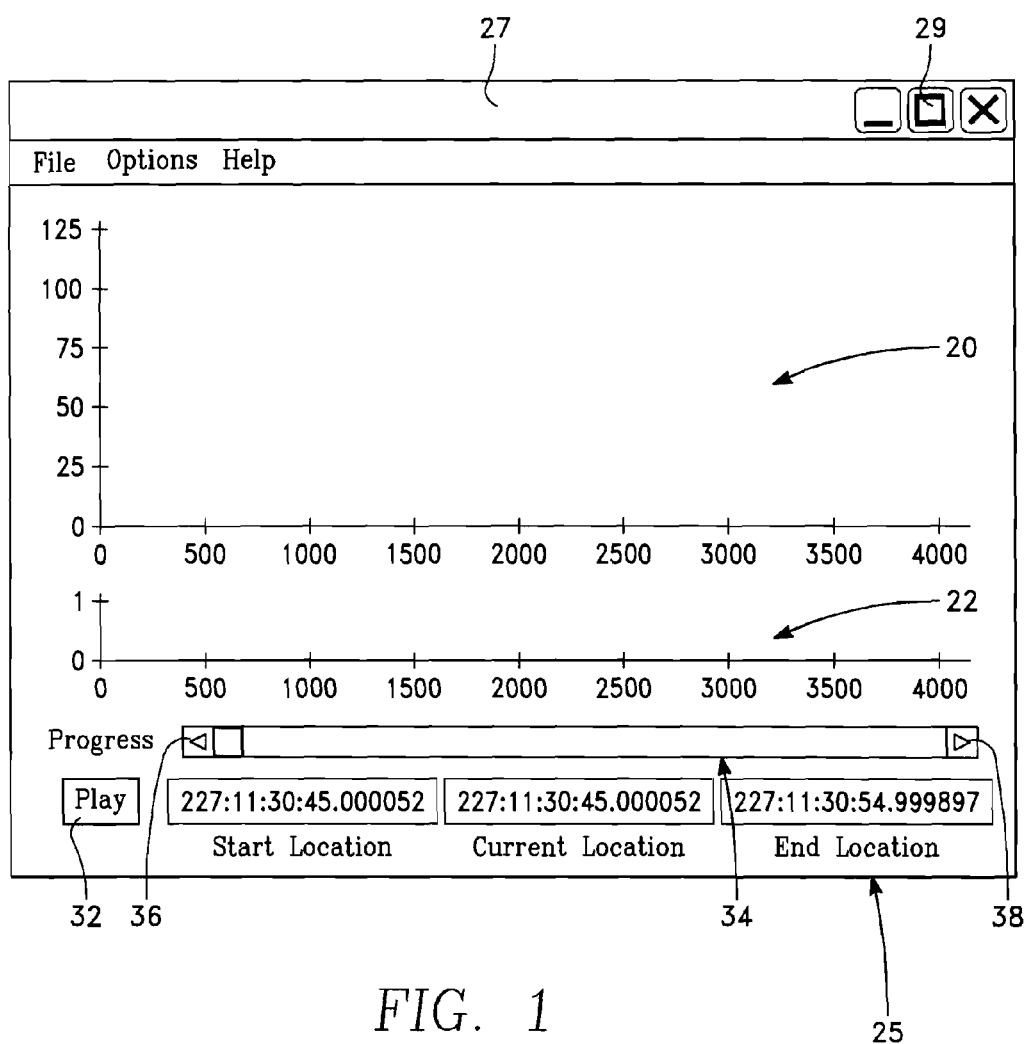
FIG. 1 depicts recorded radar video data graphs generated by the computer software program comprising the radar video data player.

The radar video data player is a software application written with Microsoft Visual Studio 2006 C++ View Class template utilizing Foundation Classes and Object Oriented Programming. This software application consists of a single document. The compatible operating systems for this software are Microsoft's Windows 2000, Windows XP and Windows Vista.

The source of the radar video data is a missile radar seeker which generates Radar Video, Master Trigger and Detection Gate signals. These signals are monitored by a radar video data telemeter on board a platform carrying the seeker which samples the radar video at 20 mega samples per second and formats that data for onboard recording and transmission to a processing station.

The transmitted radar video data is compressed prior to formatting the data into frames suitable for transmission by the platform's telemetry system at a transfer rate of five mega bit per second data rate. The data is encrypted prior to transmission, decrypted upon reception at a processing station and simultaneously displayed and recorded in real time. The radar video data is further processed by embedding four bytes of time data representing a count of milliseconds elapsed during the day corresponding to Coordinated Universal Time or UTC. The time data is inserted immediately following the frame sync. The processed data is saved in a file with a ".bin" file extension that is used by a player program to identify the contents of the file.

The recorded data is not compressed but formatted and sent to a digital recorder via an encryption device at a 20 mega bytes per second data transmission rate. The recorder inserts at regular intervals (in this case every 4,356 bytes) a Virtual Frame Header followed by a Drive Header that contains the IRIG time (UTC) with a one millisecond resolution at nearly a one microsecond accuracy. Following recovery of the recorder the data is transferred to a computer and saved in a file with a ".red" file extension for processing by a DataDecryption program which is a decryption program. During the decryption process the decryption program provides the user with the option of saving the decrypted data with or without time. Following the user's selection the radar video data is saved with or without time in a file with an ".adt" (with time) or ".add" (without time) file extension.

If the user opts to save the radio video data with time the decryption program interpolates the time of each frame from the first and last times in the recorder's first and last drive header respectively and inserts the time immediately following the frame sync. The inserted time is formatted into six bytes representing a count of microseconds elapsed during the year. It is preferred to save the time with the radar video data.

When the software application is first activated a notice to a user appears on a display screen that the application does not display radar data in real time. The playback for data display depends on the processing speed of the computer on which the software application is run and the type of file containing the radar data.

Once the user acknowledges the notice, the notice disappears from the display screen and an empty window appears on the display screen. The user then has the option of selecting one of the following four files types to play back. The *.add and *.adt files are recorded video files and the *.tvd and *.bin files are transmitted video files (1) A file containing data in the onboard recorded radar video data format with time inserted after each frame sync (*.adt).
(2) A file containing data in the onboard recorded radar video data format without time (*.add).
(3) A file containing data in a telemetered radar video data format with time inserted after each frame sync (*.bin).
(4) A file containing data in the telemetered radar video data format without time (*.tvd).

If the user selects an invalid file type the computer software will detect the invalid file type and send the user the following message which is displayed on a display screen or computer monitor.

File Open Failed Invalid File Selected

Figure 2:
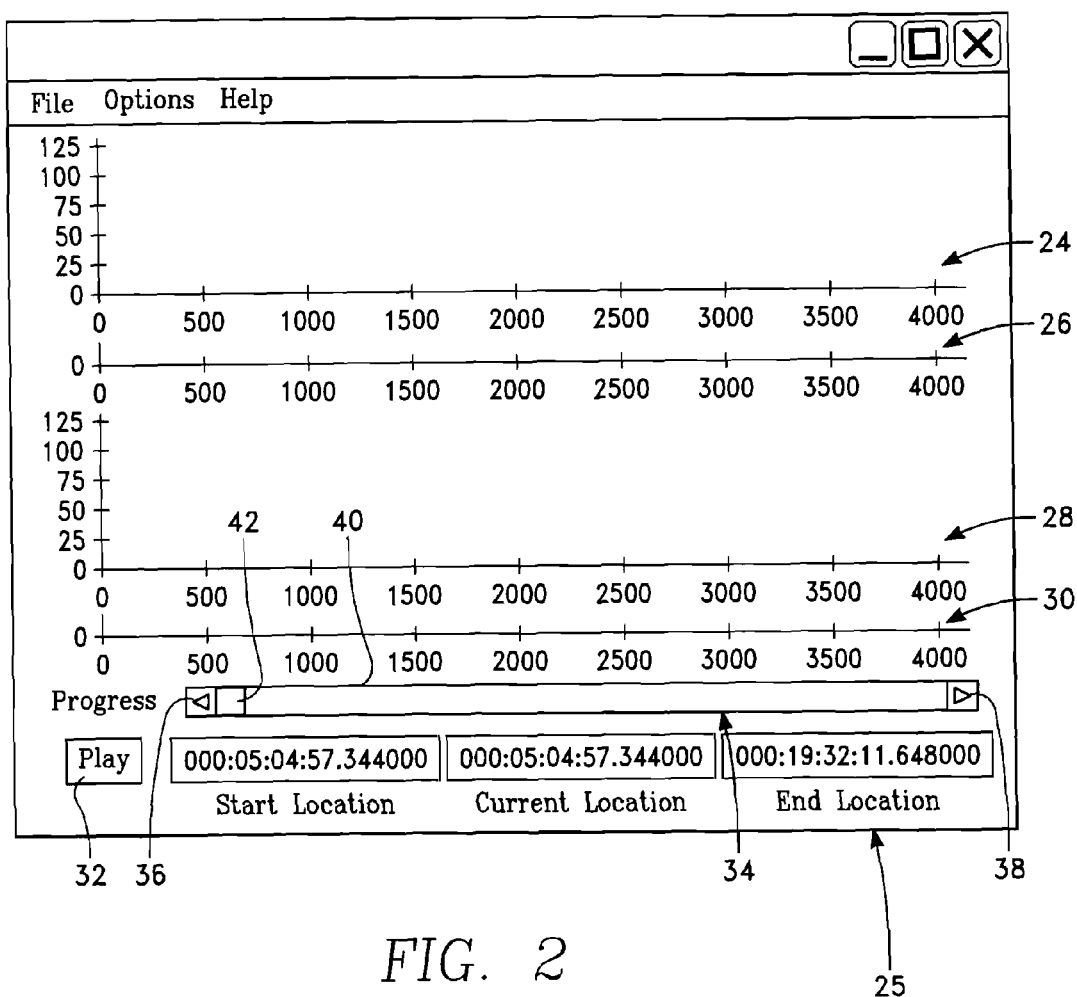
FIG. 2 depicts transmitted radar video data graphs generated by the computer software program comprising the radar video data player.
Figure 3:
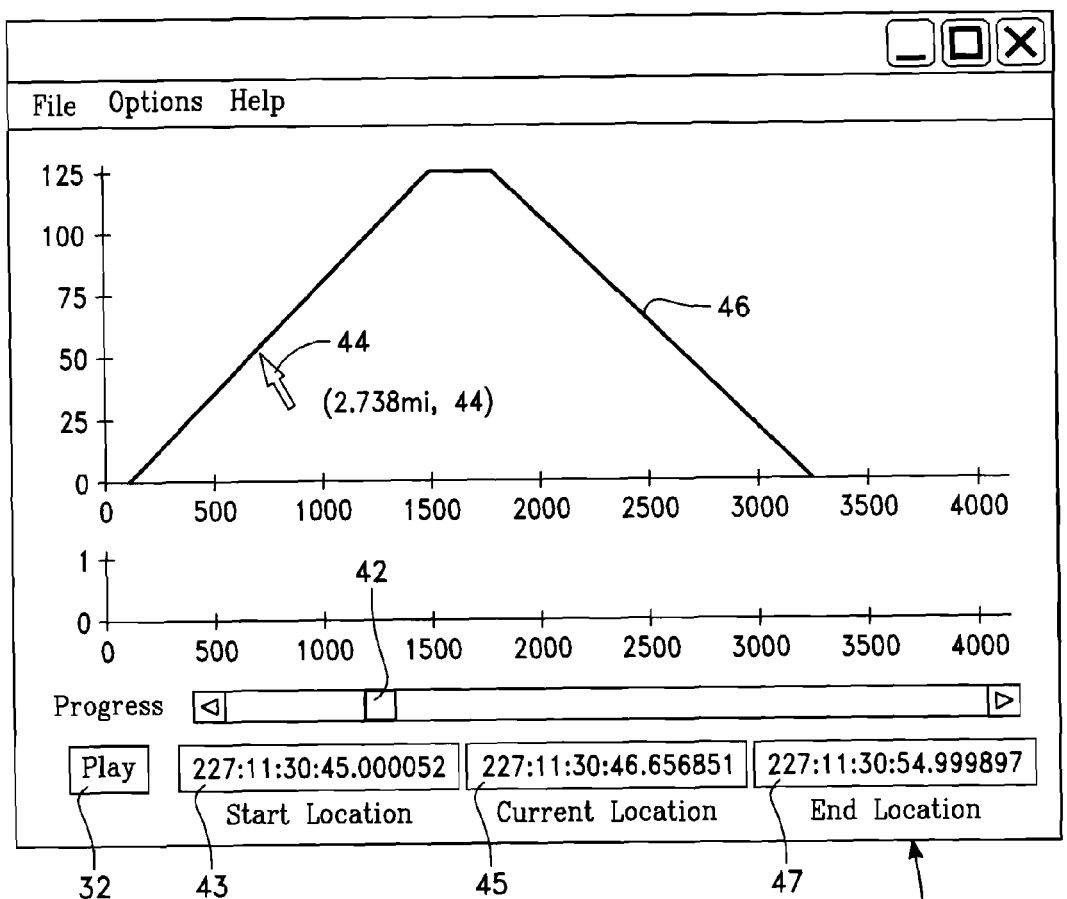
FIG. 3 is a sample test pattern data display of a radar video data graph generated by the computer software program comprising the radar video data player.

Referring to FIGS. 1 and 2, once the file containing the radar video data to play back is selected and opened, a set of graphs appear in which the data is displayed. The number of graphs displayed depends upon the type of file selected. If an onboard recorded data file is selected by the user, the graphs will appear as shown in FIG. 1. Two graphs or grids 20 and 22 one for the radar video data 20 and one for the detection gate 22 are displayed on a display screen 25 when an onboard recorded data file is selected by the user. Detection gate plots, as shown in the displays of FIGS. 1, 2 and 3, are shown displayed as a zero. Actual recorded data will show pulses transitioning between zero and one.

If the user selects a transmitted data file, four graphs will appear on the display screen 25 as shown in FIG. 2. One set of Radar video data graphs 24 and 26 are for a peak data set and the other pair of video data graphs 28 and 30 are for an average data set. None of the graphs of FIGS. 1 and 2 show any data until the user selects a play button 32. Clicking the play button 32 starts the playback of the radar video data and also changes the function of button 32 to a stop function.

In addition to the radar video data graphs of FIGS. 1 and 2, and the play button 32, a progress slider/slider control bar 34 is provided on the display screen 25. The position of the progress slider bar 34 indicates the progress of the playback of the radar video data. Clicking a slider control arrow 36 or a slider control arrow 38 advances the playback in either a forward direction (clicking arrow 38) or a reverse direction (clicking arrow 36). The advance is by one part in ten thousand parts comprising the size of the file. The one part in ten thousand parts step advances are defined as small steps skipping approximately eight scans in a typical 4 gigabyte file.

Clicking the slider control bar 40 after or before a slider indicator/scroll 42 advances the playback in either a forward direction or a reverse direction by one part in one hundred parts comprising the size of the file. The one part in one hundred parts step advances are defined as big steps.

Dragging the slider indicator 42 displays the data contained in that particular location within the file.

Located at the top of display screen 25 is a title bar 27 which is depicted in FIG. 1.

When the display on display screen 25 is not playing, that is when a file is first opened or the playback has been stopped, slider control 34 allows a user to statically view radar video data at any location which the user selects in the file. The Options drop down menu in the upper left hand corner of display screen 25 includes a function identified as "enable single step". Whenever the user enables the single step option by selecting "enable single step" from the Options drop down menu, clicking the slider control arrow 36 or the slider control arrow 38 advances the display one frame in either the forward direction (arrow 38) or the reverse direction (arrow 36). This, in turn, provides the user with the capability of stepping through each frame of the radar video data.

Start Location, Current Location and End Location values of the radar video data are displayed respectively in text boxes 43, 45 and 47 shown in FIG. 3. For files containing embedded time the Location edit boxes 43, 45 and 47 display the Start time, Current time and End time of the radar video data in the file. For files that do not contain embedded time the Location edit boxes display the Start, Current and End file pointer values for the radar video data in the file. The Start file pointer value is always zero (location of the first byte in the file) and the End file pointer value indicates the size of the file in bytes (also the location of the last byte in the file).

The Main Program Window display screen 25 (FIGS. 1, 2 and 3) features a command bar 27 containing three basic sets of commands: File, Options and Help. The File set provides the user with the option of opening one of the data files transmitted or recorded video or the option of exiting the program and thereby closing the program window. The Options set provides the user with a couple of sets of display options that are used to aid in the analysis of the displayed data. The Help command has only one function and that is to display the version of the player program along with a distribution notice and restricted rights.

Referring to FIG. 3, the Options drop down menu provides a user with multiple data display options for the radar video data the user is currently viewing. The user can select options from the drop down menu to display the location and value of the data pointed to by a cursor arrow 44 within graph 46 of the radar video data currently being viewed on display screen 25. Data display options available to the user include sample number, distance in miles, distance in nautical miles, distance in feet, distance in kilometers and a data sample format which may be a discrete value, a value in dB or a value in volts. For the placement of cursor arrow 44 at the position on plot 46 illustrated in FIG. 3, the distance in miles is 2.738 miles and the discrete value is 44.

At this time, it should be noted that the X-axis scale is labeled to show the sample location of radar video data within a radar scan. The Y-axis scale of the radar video data is labeled to cover the range of the values of the 7-bit radar video data. Likewise, the Y-axis scale of the detection gate data is labeled from zero to one to cover the range of values of that 1-bit data.

Figure 4A:
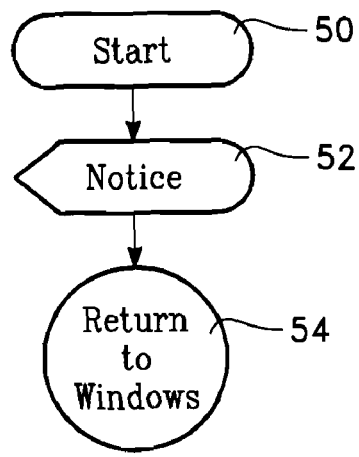
FIG. 4A is flow chart for the Start module of the computer software program comprising the radar video data player.
Figure 4B:
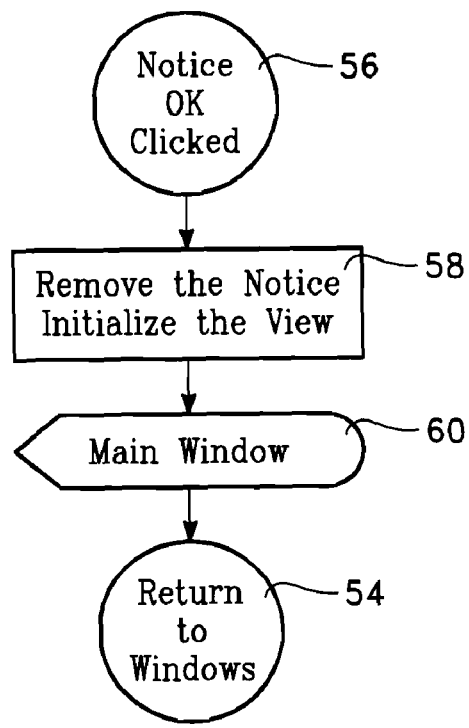
FIG. 4B is a flow chart for the Notice OK Clicked module of the computer software program comprising the radar video data player.

Referring to FIGS. 4A and 43, in FIG. 4A a program flow chart for the program startup module is depicted. Upon starting the program (program step 50), the user is presented with a message notifying the user that "This program does not play the data in real time" (program step 52). Following the acknowledgement of this message through the mouse or keyboard (program step 56), the notice is removed and the view is initialized for showing graphical plots on display screen 25 (program step 58) and the main program window is opened or displayed (program step 60). The main program window is first displayed without the horizontal and vertical axis scales being displayed on display screen 25 (FIG. 1). Display screen 25 displays the data in a manner that emulates a real time display.

Figure 4C:
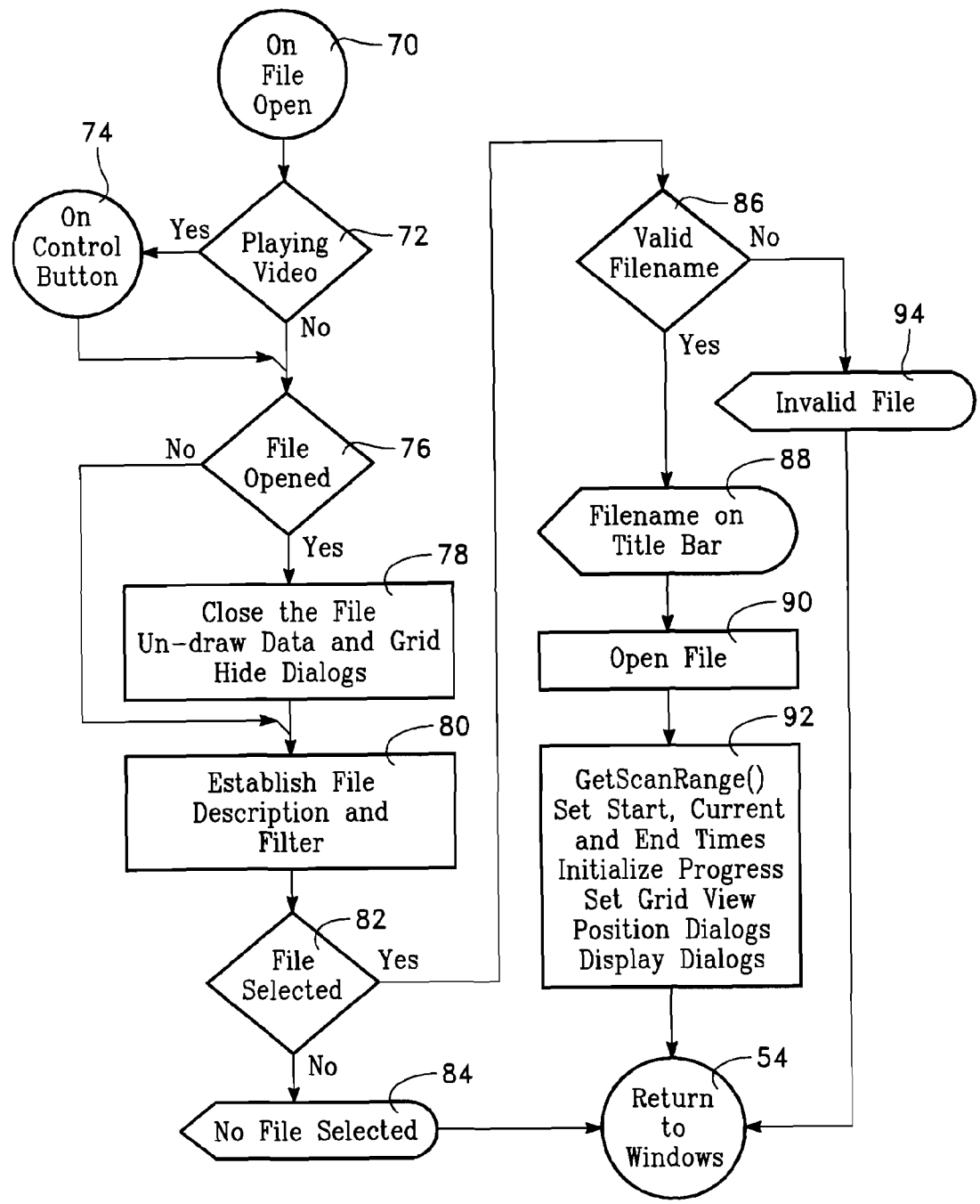
FIG. 4C is a flow chart for the On File Open module of the computer software program comprising the radar video data player.

Referring to FIG. 4C, the On File Open module is opened (program step 70). The On File Open is entered via the File drop down menu located at the upper left hand corner of display screen 25 (FIG. 1). The File drop down menu includes a file open dialog which allows the user to select the file type or file extension (recorded or telemetered radar video data) and the actual file to be opened.

The On File Open module opens a file for the purpose of displaying the radar video data within the file being opened. During program step 72 a decision is made as to whether a video is currently playing on display screen 25. If video is currently playing on display screen 25, the On Control Button module (program step 74) stops the video currently playing and clears the display screen 25. If video is not currently playing then the program proceeds to program step 76 to determine if a file containing radar video data has been opened.

When a file has not been opened, the program proceeds from program step 76 directly to program step 80. When a file containing radar video data was previously opened the software proceeds to program step 78 which closes the currently open file and undraws the data and the grid from display screen 25 and also hides the open dialogs from display screen 25.

Program step 80 establishes the file description and filter for the file from which the radar video data will be displayed. The filter is the file type to be selected, that is the telemeter data files or the recorded data files.

Program step 82 indicates whether or not the user selects a file containing radar video data for display. When the answer is "No", program step 84 displays to the user "No File Selected" and the program proceeds to return to Windows (program step 54).

When a file is selected program step 86 checks to see if the file is a valid file name. When the file name is invalid, the information that the file name is invalid is displayed to the user and the program returns to Windows (program step 54).

When the file name is valid, the file name is displayed in the title bar 27 on display screen 25. Program step 90 opens the file to be displayed on display screen 25.

Program step 92 examines the file that was opened in program step 90 to get the scan range or a time range which are displayed at the start location 43 and end location 47 on display screen 25 (FIG. 3). For a file that does not contain time (*.add and *.tvd files) the scan range, start location 43 is initially zero, end location 47 displays the end file pointer value or file size, and current location initially displays zero. For files containing time (*.adt and *.bin files) the time initially displayed in the start location 43 and current location 45 are identical and the end location 47 displays the time at the end of the file. The slider bar 34 is initialized to zero with slider indicator 42 being position at the left end of the slider bar 34 as shown in FIG. 2.

Program step 92 sets the grid view which is depicted with two grids 20 and 22 when the file is a recorded file depicted in FIG. 1. The two grids displayed are the video gird 20 and detection gate grid 22. FIG. 2 depicts a telemeter file which includes a peak video grid 24 and a detection gate grid 26 as well as an average video grid 28 and detection gate grid 30. Dialogs are positioned and displayed including start location 43, current location 45 and end location 47. After completing program step 92, the software returns to Windows (program step 54).

At this time it should be noted that return to windows (program step 54) returns control to the Windows operating system. The return program step 122 returns the program to the particular calling location from which the routine was called. For example, in program step 92 when the GetScanRange( ) routine (program step 100, FIG. 5A) is completed the software returns to program step 92.

Figure 5A:
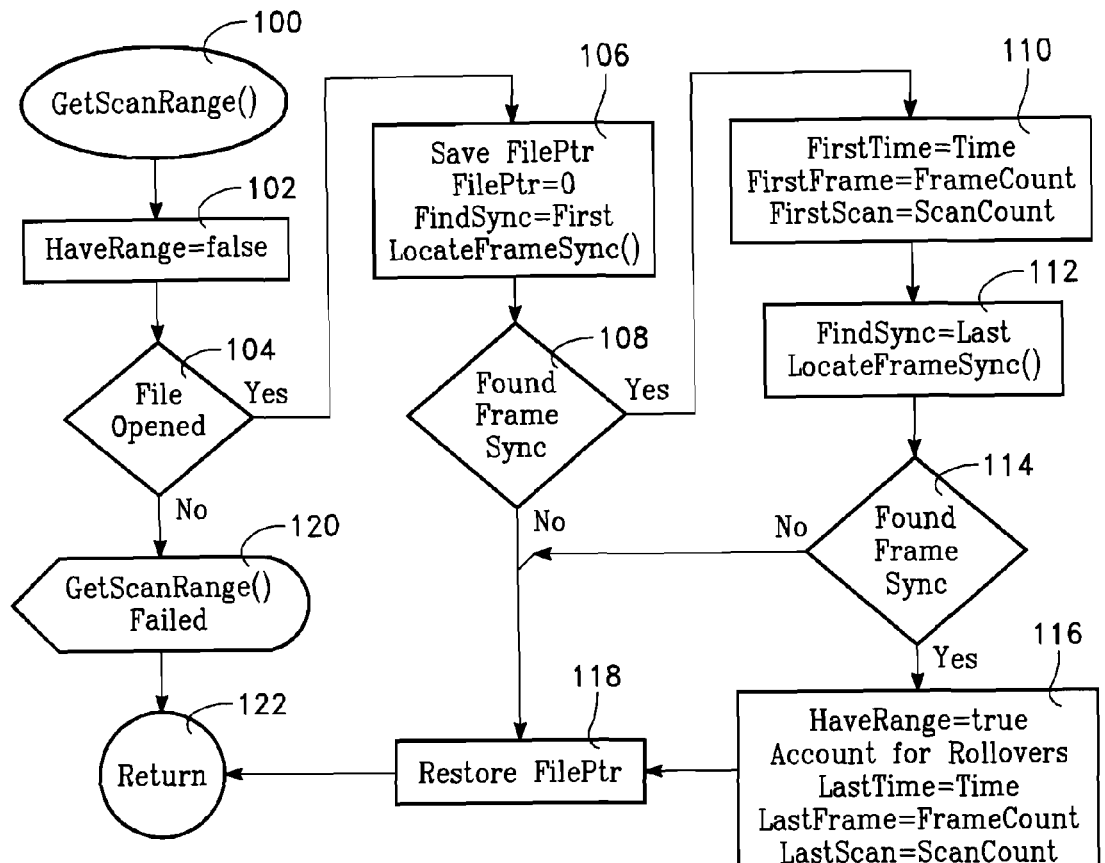
FIG. 5A is a flow chart for the GetScanRange( ) module of the computer software program comprising the radar video data player.

Referring to FIG. 5A, the GetScanRange( ) routine of FIG. 5A is entered via program step 100 when the GetScanRange( ) routine is called by the software in program step 92. A HaveRange flag is set equal to false (program step 102). Program step 104 determines if a file is open. When a file is not open an error has occurred and the software proceeds to the program step 120 displaying to the user a message that "GetScanRange( ) Failed".

When a file is open, program step 106 saves the file pointer. This allows the software to point back into the location in the file where the program was looking at the radar video data when the GetScanRange( ) routine is called. During program step 106 the file pointer is next initialized to zero. The program saves the file pointer prior to setting the file pointer to zero. This allows the software to start at the beginning of a new file and display the range video data for that particular file.

Figure 8:
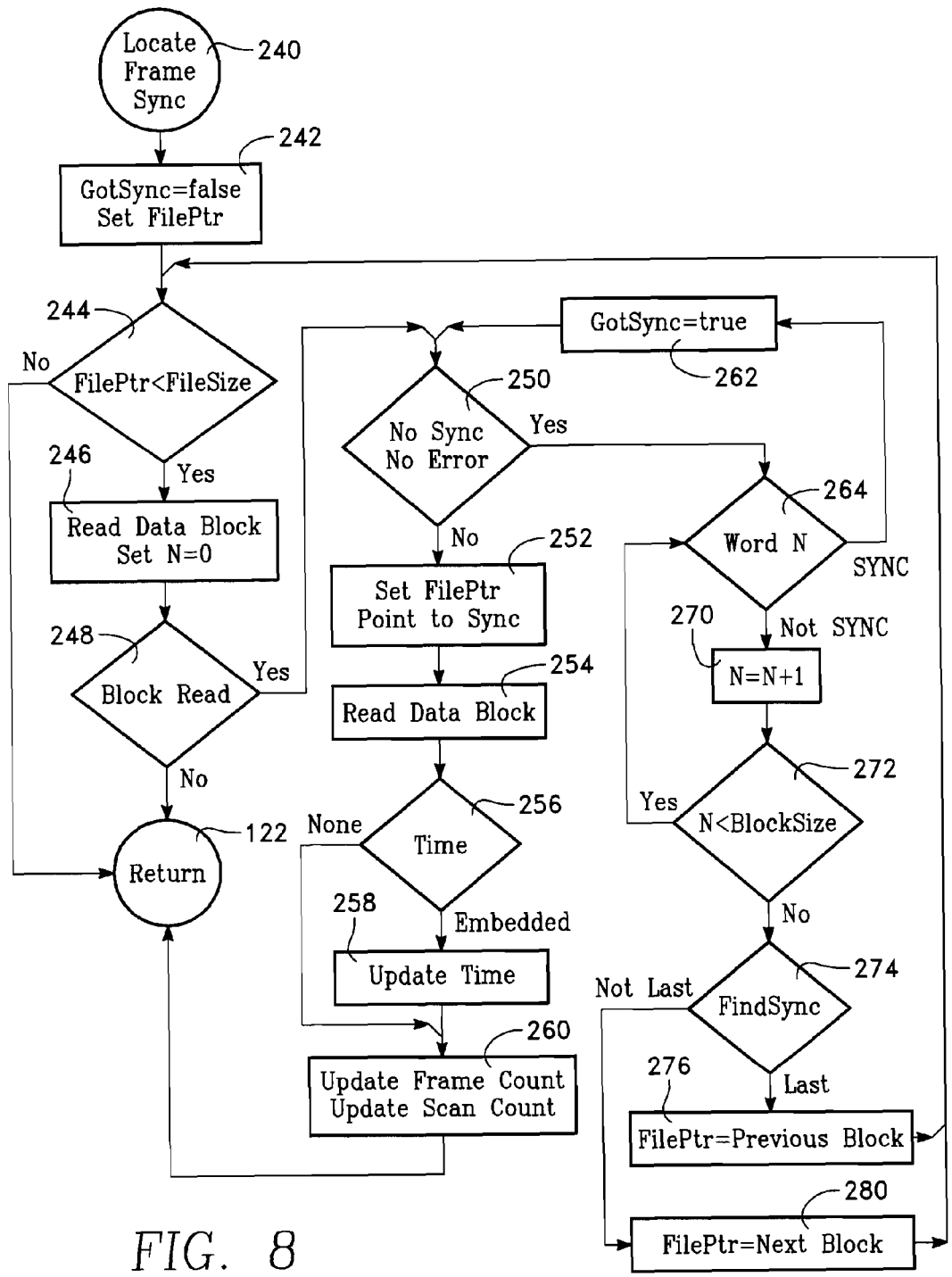
FIG. 8 is a flow chart for the Locate Frame Sync module of the computer software program comprising the radar video data player.

Program step 106 also has a FindSync flag which is set allowing the program to find the first sync in the new file. The routine LocateFrameSync( ) of FIG. 8 is called in program step 106 to locate the first sync in the new file. The radar video data and the detection gate data follow the frame sync in each frame. When a frame sync is located (program step 108) the software proceeds through program step 108 to program step 110. When a frame sync is not present the software proceeds to program step 118. Program step 118 restores the file pointer and the software next proceeds to return (program step 122). The file pointer returns the radar video data player back to the file which the user was previously viewing on the display screen 25.

Program step 110 receives time, frame count and scan count from the LocateFrameSync( ) routine of FIG. 8. Program step 110 saves time as the first time, saves frame count as the first frame and scan count as the first scan.

Program step 112 locates the last sync in the new file. The FindSync flag is set to last and the LocateFrameSync( ) routine of FIG. 8 is called. If the last frame sync is not found, program step 114 proceeds to program step 118 to restore the file pointer and then onto program step 122 to return to the calling program. If the last frame sync is found the software proceeds to program step 116. Program step 116 sets a flag HaveRange equal to true. Program step 116 also accounts for rollovers since the program counter for frame count is limited to twelve bits. For large files multiple rollovers sill occur which are accounted for in program step 116. Program step 112 also receives time, frame count and scan count from the LocateFrameSync( ) routine of FIG. 8. Program step 112 saves time as the last time, saves frame count as the last frame and scan count as the last scan. The first time and last time appear in boxes 43 and 47 of FIG. 3, respectively. The file pointer is restored (program step 118) and the software proceeds to return (program step 122).

Figure 5B:
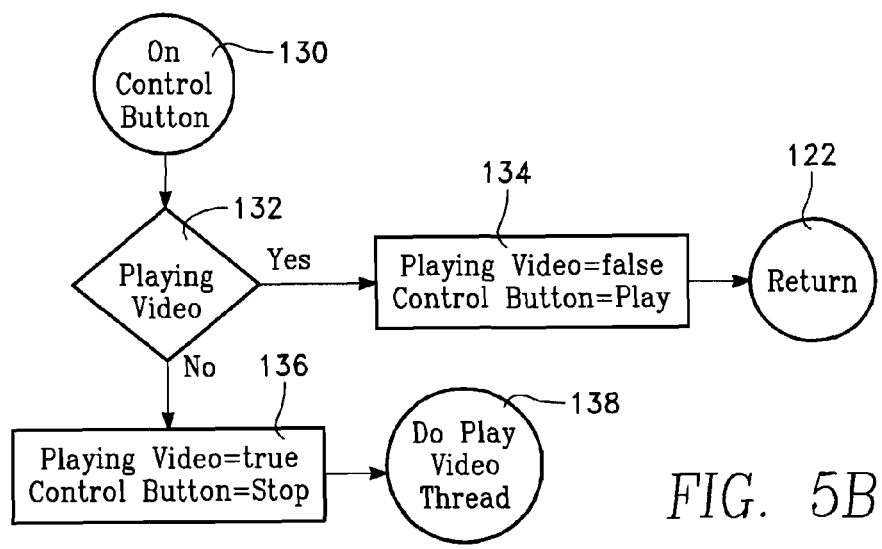
FIG. 5B is a flow chart for the On Control Button module of the computer software program comprising the radar video data player.

Referring to FIG. 5B, FIG. 5B is the On Control Button routine (program step 130) which operates as a toggle switch. This routine is called from program step 74 of FIG. 4C.

Program step 132 is a decision block which ask if video is currently playing and if the answer is "Yes" then the software stops playing the video by setting PlayingVideo equal to false and sets the control button 32 equal to play (program step 134) and then proceeds to return to the calling routine in program step 122. When the answer is "No" the software sets playing video equal to true and sets the control button 32 to display stop (program step 136). The software proceeds to the Do Play Video Thread 140 of FIG. 6A which displays the radar video data on display screen 25 (program step 138).

Figure 6A:
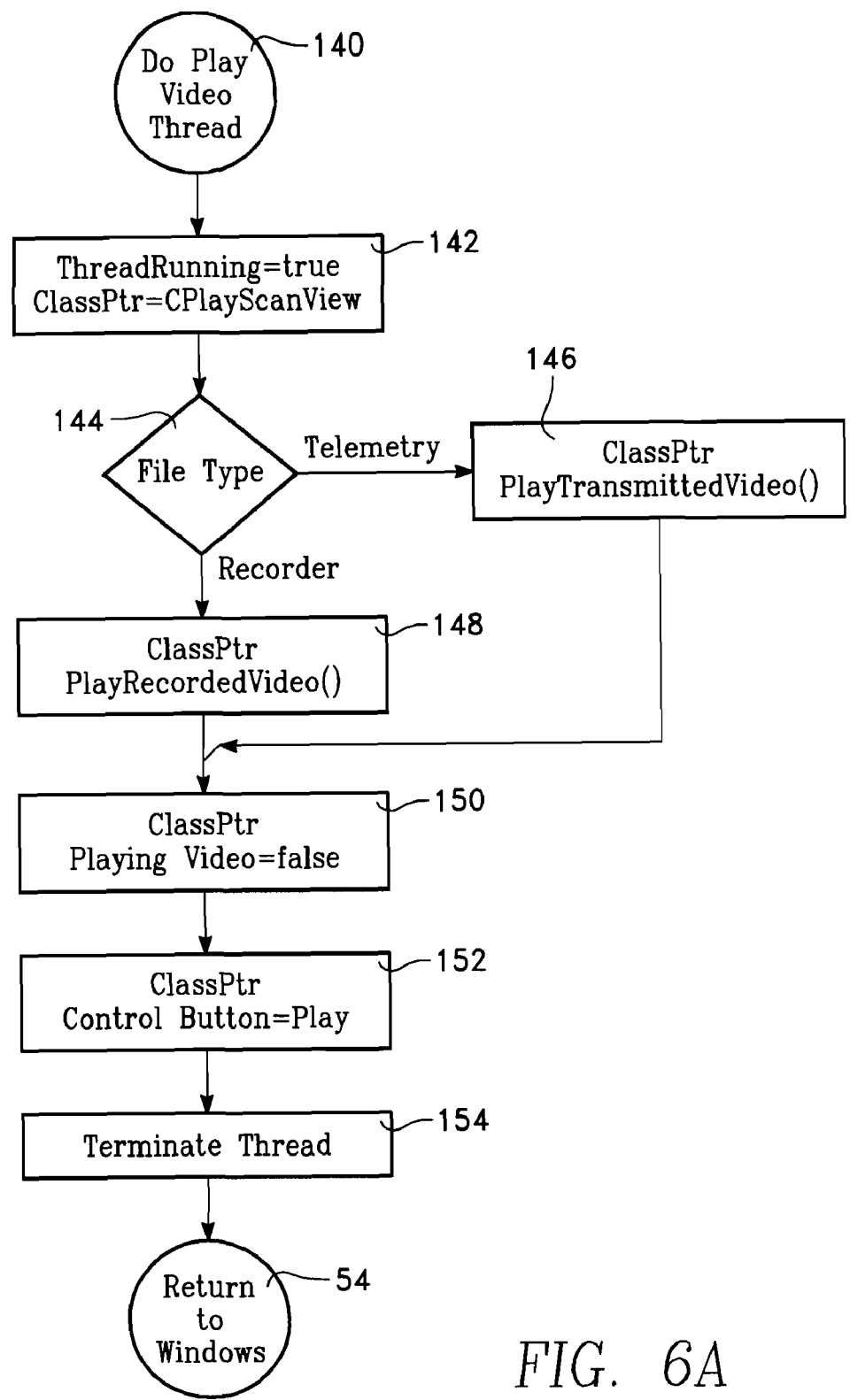
FIG. 6A is flow chart for the Do Play Video Thread module of the computer software program comprising the radar video data player.

Referring to FIG. 6A, the Do Play Video Thread of program step 140. Program step 142 sets the ThreadRunning flag equal to true. A class pointer is set to the play scan view class to point to other routines called by the Do Play Video Thread of FIG. 6A. Program step 144 determines the type of video data to be displayed on display screen 25.

When the telemeter provides the radar video data to be displayed on display screen 25, the software proceeds to program step 146. The class pointer 146 calls the Play Transmitted Video routine of FIG. 7. The Play Transmitted Video routine of FIG. 7 plays the transmitted radar video which appears on graphs 24 and 26 and graphs 28 and 30 illustrated in FIG. 2.

When the recorder provides the radar video to be displayed on display screen 25, the software proceeds to program step 148. Program step 148 utilizes the class pointer to point to the PlayRecordedVideo( ) routine of FIG. 6B. The Play Recorded Video routine of FIG. 6B plays the recorded radar video which appears on graphs 20 and 22 illustrated in FIG. 1.

When the playing of the radar video data is complete, the software proceeds to program step 150. The class pointer toggles the flag Playing Video equal to false during program step 150. Program step 152 then uses the class pointer to set the control button 32 equal to play. Program step 154 terminates the thread followed by a return to windows (program step 54).

Figure 6B:
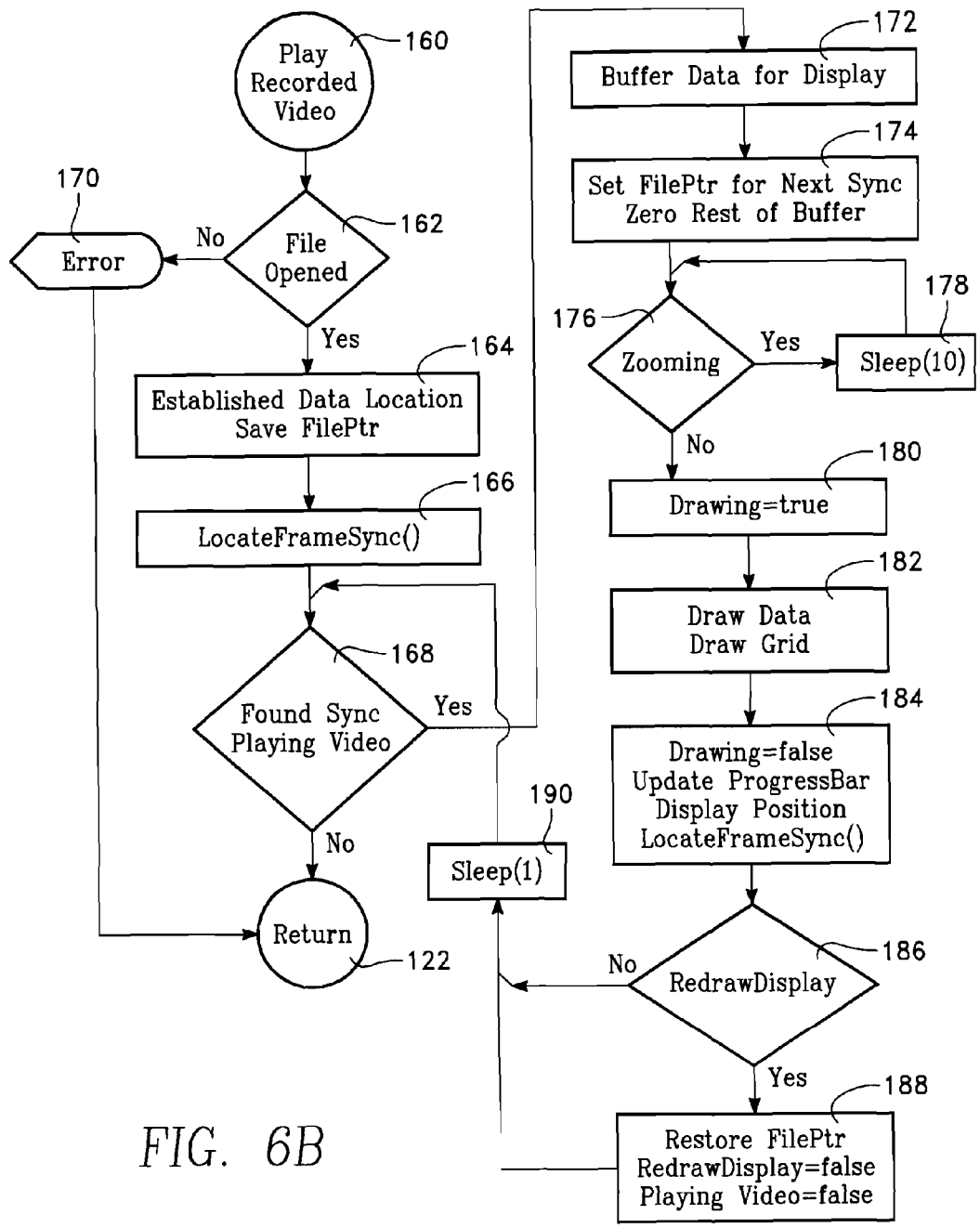
FIG. 6B is a flow chart for the Play Recorded Video module of the computer software program comprising the radar video data player.

Referring to FIG. 6B, the Play Recorded Video routine 160 of FIG. 6B is called from program step 148 of FIG. 6A. Program step 162 determines if a file is open. When a file is not open, the software provides an Error message which is displayed (program step 170), and the software proceeds back to the calling function (program step 122), the Play Recorded Video routine of program step 148.

When a file is open, the software establishes a data location and saves the file pointer (program step 164). The file pointer is saved to prevent destruction of the file pointer in case an error occurs or the display routine is aborted. Saving the file pointer allows the user to return to the previous file location displayed.

The function establish data location of program step 164 establishes the exact location in the file where slider indicator 42 is pointing when the user moves slider indicator 42 to the location either by dragging slider indicator 42 or using the slider control arrows 36 and 38 at the end of slider control bar 34.

Program step 166 enters a Locate Frame Sync routine (FIG. 8) to locate the frame sync for the frame. Each frame within a file has a frame sync which occurs prior to the first data sample in the frame. Locating the frame sync allows each of the data samples within the frame to be accessed and displayed on display screen 25. The number of Radar Video Data Samples in a recorded Video Data "scan" is approximately 4000 samples.

When the software cannot locate a frame sync (program step 168), the software proceeds to return (program step 122) returning to the PlayRecordedVideo( ) program step 148 in FIG. 6A.

When the frame sync is found and there is video playing then the program proceeds program step 172 which buffers the radar video data for display. Program step 174 sets the file pointer for the next frame sync of the next frame to be displayed on display screen 25. Program step 174 also zeros the remainder of the buffer. The rational for placing zeros in the rest of the buffer is to compensate for the variable length of the frames. The display on display screen 25 is a fixed length display of 4000 samples.

For example, if there are only 3900 data samples for display zeroing the remainder eliminates false data from the end of the radar video data plot viewed on display screen 25.

Program step 176 tests to see if the user is zooming in to the display on display screen 25 or zooming out from the display screen 25.

To further enhance the utility of the program, zooming functions were added to the software providing the user with the capability to zoom into a particular sample location. Double clicking the mouse on the desired point on the display allows the user to zoom into the desired point with the left mouse button which expands by a factor of two the X-axis about this point. The minimum and maximum X-axis bounds (0 and 4,096) are maintained through the zooming function so all displayed values are valid. The user has the ability to zoom into a particular point up to 6 times providing the user with the ability to discern individual data samples. If the user attempts to zoom in or zoom out too far a message is displayed informing the user that the zooming limit function is reached.

Program step 178 provides a sleep (10) routine which allows the software to wait for a time period in increments of ten milliseconds while the user is performing the zooming function. Since the program is a threaded program which performs multiple functions simultaneously, it is desirable to have a wait period. For example, it is desirable not to redraw the display screen 25 when the user zoom activates the display screen 25. This would result in two separate scales appearing on the same plot of radar video data which is not desirable.

When zooming is not occurring, a drawing flag is set true indicating that data is being drawn onto the graph 46 as shown in FIG. 3 (program step 180). The zooming function also tests to see if the user is drawing the data and grid. When, for example the user double clicks the mouse to zoom in on a plot, such as plot 46, the software will delay the zooming function until drawing is complete. Two functions zooming and drawing cannot be performed on the plot on display screen 25 simultaneously.

Program step 182 draws the data such as radar video data plot 46 of FIG. 3 and the X and Y coordinates of the grid. Program step 184 sets the drawing flag false when drawing of the plots, such as plot 46 of FIG. 3, is completed. The progress bar 40 on the slider control bar 34 is updated and the position is displayed in the current location box 45. Program step 184 also locates the next frame sync using the routine LocateFrameSync( ) of FIG. 8. The file pointer was set to locate this frame sync in program step 174.

Program step 186 test the Redraw Display flag. The Redraw Display flag is set to "Yes" when the video is not being played and the user has changed the position of slider indicator 42 on the progress bar 40. The display needs to be redrawn. When the Redraw Display flag is "Yes", the software proceeds to program step 188, the file pointer is restored to the frame sync that the software previously saved. The Redraw Display flag is set false and the playing video flag is also set false. Program step 190 provides for a wait period of one millisecond before proceeding to program step 168. The process is repeated to draw the next plot and its associated grid if the Playing Video flag is true.

Figure 7:
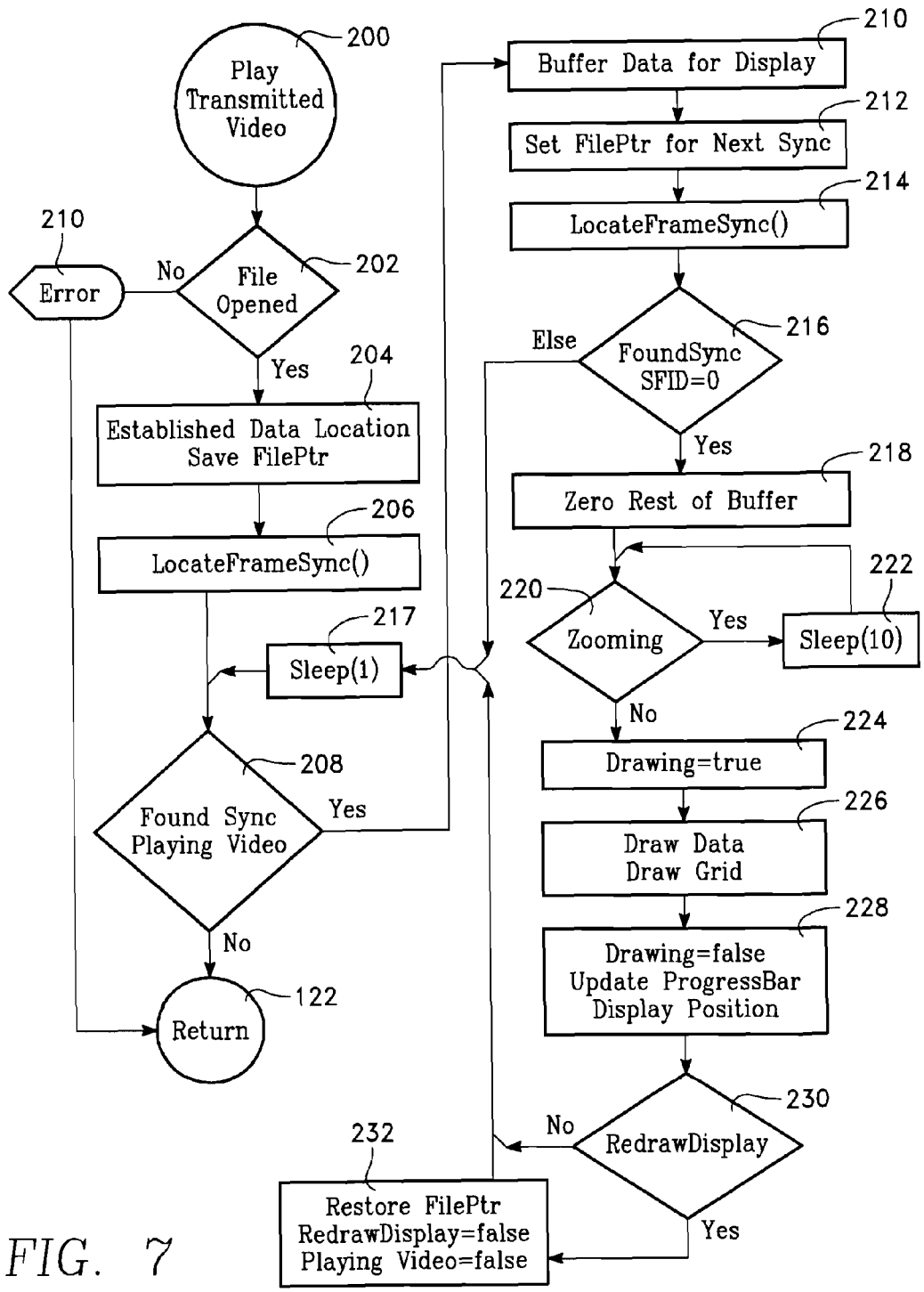
FIG. 7 is a flow chart for the Play Transmitted Video module of the computer software program comprising the radar video data player.

Referring to FIG. 7, the Play Transmitted Video routine 200 of FIG. 7 is called from program step 146 of FIG. 6A. Program step 162 determines if a file is open. When a file is not open, the software provides an Error message which is displayed (program step 210), and the software proceeds back to the calling function (program step 122), the Play Transmitted Video routine of program step 146.

The function establish data location of program step 164 establishes the exact location in the file where slider indicator 42 is pointing when the user moves slider indicator 42 to the location either by dragging slider indicator 42 or using the slider control arrows 36 and 38 at the end of slider control bar 34.

When a file is open, the software establishes a data location and saves the file pointer (program step 204). The file pointer is saved to prevent destruction of the file pointer in case an error occurs or the display routine is aborted. Saving the file pointer allows the user to return to the previous file location displayed.

Program step 206 enters a Locate Frame Sync routine (FIG. 8) to locate the frame sync for the frame.

When the software cannot locate a frame sync (program step 208), the software proceeds to return (program step 122) returning to the PlayTransmittedVideo( ) program step 146 in FIG. 6A.

When the frame sync is found and there is video playing then the program proceeds program step 210 which buffers the radar video data for display. Program step 212 sets the file pointer for the next frame sync of the next frame to be displayed on display screen 25. Program step 214 locates the frame sync using the LocateFrameSync( ) of FIG. 8. By locating the next frame sync (program step 214), the software is able to determine that an entire frame of radar video data has been received for display.

For the Transmitted Data Frame Format there are eight subframes for each frame of data in the transmitted video. Each subframe looks like a frame and contains a subframe identification that increments from zero to seven. Subframe ID zero contains the beginning video data bytes for the frame. Recorded video data contains only one frame of radar video data and no subframes.

When the sync for subframe ID zero is located, the software proceeds to program step 218. Program step 218 zeros the remainder of the buffer. The rational for placing zeros in the rest of the buffer is to compensate for the variable length of the frames.

Program step 220 tests to see if the user is zooming in to the display on display screen 25 or zooming out from the display screen 25. If the user is using the zoom function, program step 222 provides for a wait in increments of ten milliseconds while the function is completed.

Program step 224 sets the draw flag to true. Program step 226 draws the data plot (e.g. plot 46, FIG. 3) and its associated grid. Program step 228 sets the drawing flag false when drawing of the plots, such as plot 46 of FIG. 3, is completed. The progress bar 40 on the slider control bar 34 is updated and the position is displayed in the current location box 45 during program step 230.

Program step 230 tests the Redraw Display flag. When the Redraw Display flag is "Yes", the software proceeds to program step 232, the file pointer is restored. The redraw display flag is set false and the playing video flag is also set false. Program step 217 provides for a wait period of one millisecond before proceeding to program step 208. The sleep period of one millisecond allows other routines within Windows to run. The process is repeated to draw the next plot and its associated grid if the Playing Video flag is true.

Referring to FIG. 8, FIG. 8 is a flow chart for the Locate Frame Sync 240 routine. This routine is called from program step 166 of FIG. 6B and program step 206 of FIG. 7. Program step 242 sets the GotSync flag false. The file pointer is also set to the desired location in the file. Program step 244 determines if the file pointer is less than the file size. If the answer is "Yes" the software proceeds to program step 246, a data block is read and an indicator or counter N is set equal to zero.

When the file pointer is not less than the file size, the end of the file has been reached and the software proceeds to Return (program step 122). The software then proceeds to the calling routine which is the Play Transmitted Video of FIG. 7 or Play Recorded Video of FIG. 6B.

Program step 248 determines if a block of data has been read. If a block of data has been read then the software proceeds to program step 250. If a block of data has not been read then software proceeds to program step 122 and returns to the calling function.

Program step 250 determines if there is no sync and no error. If the answer is "Yes" then the software proceeds to program step 264. The software then proceeds to look for the frame sync. If the frame sync is found, then the file pointer is set to point to the frame sync that was located (program step 252). The block of data is reread which includes the frame sync located by the Locate Frame Sync software routine of FIG. 8. This ensures that the block of data read begins with a frame sync.

Program step 256 determines if time is embedded in the recorded or transmitted data. Whenever time is embedded in the data program step 258 updates the time. Program step 260 updates the frame count and the scan count. Update time, frame count and scan count are global variables which are used by the calling routine to obtain the time located in the Locate Frame Sync routine. The frame count and scan count are also obtained for the particular frame being read by the software. The frame count and scan count are saved by the Locate Frame Sync routine for use by the calling routine. There are multiple instances through the software for the radar video data player when the frame count and scan count are utilized by a calling software routine.

If time is not embedded in the data then the software proceeds to program step 250 updating the frame count and the scan count.

If the software is unable to locate a frame sync and an error has not occurred, then the software proceeds to program step 264. The counter N is initially set to zero. Counter N is an index which is incremented as each byte within a block of data is examined. When byte N is the first byte of the frame sync then the software proceeds to program step 262 the GotSync flag is set indicating the frame sync has been located.

When byte N is not the first byte of the frame sync then the software increments the counter to index the next byte (program step 270). The software determines if N is less than the block size then the software enters a loop until the frame sync is located (program step 264, 270 and 272). When the frame sync is located then the software proceeds to program step 262 setting the GotSync flag equal to true.

If the software is unable to locate the frame sync and N is not less than the block size the software proceeds to program step 274. At this point the software has scanned the entire block of radar video data examining every byte with the block of radar video data and is unable to locate a frame sync.

Program step 274 determines if the frame sync to be located during the Locate Frame Sync routine 240 is the last frame sync. When the frame sync is the last frame sync the file pointer is set to the previous block of data (program step 276).

FindSync is a flag set by the calling routine prior to entering the Locate Frame Sync routine 240. This flag is generally set such that the flag indicates that the frame sync to be located is not the last sync. When the frame sync located by the software is not the last frame sync the software proceeds to program step 280 setting the file pointer to the next sequential block of radar video data. The software returns to program step 244 and repeats the routine for locating the frame sync for the next block of radar video data being examined by the software.

When the Locate Frame Sync routine is called and there is a search for the last frame sync within the file then the software proceeds to examine the last block of data located the end of the file. The software will then examine the next to last block of data at the end of the file to determine if there is a frame sync within this block. It should be noted that it is possible to have in a file a block of data at the end of the file that does not include a frame sync. When the radar video data is processed during the decryption process by the decryptor there is no indication provided by the decryptor that the end of the radar video data stream has been reached. This results in false data appearing at the end of the file, which is data without a frame sync at the end.

When it is required to find the last frame sync in a file, The FindSync flag is set to last by the calling routine prior to entering the Locate Frame Sync routine. Program steps 274 and 276 allow the software to continue a search for the last frame sync in the file until the last frame sync is located within the file. The search is repeated for each block of radar video data beginning with last block of data, then the next last block of data and proceeding in a reverse direction through each block of data until a frame sync is located.

When the FindSync flag is set to "not last" the software looks for the next frame sync in the file of radar video data to be displayed or the next frame sync when the software is processing blocks of radar video data within various locations within a file currently being played.

Figure 11A:
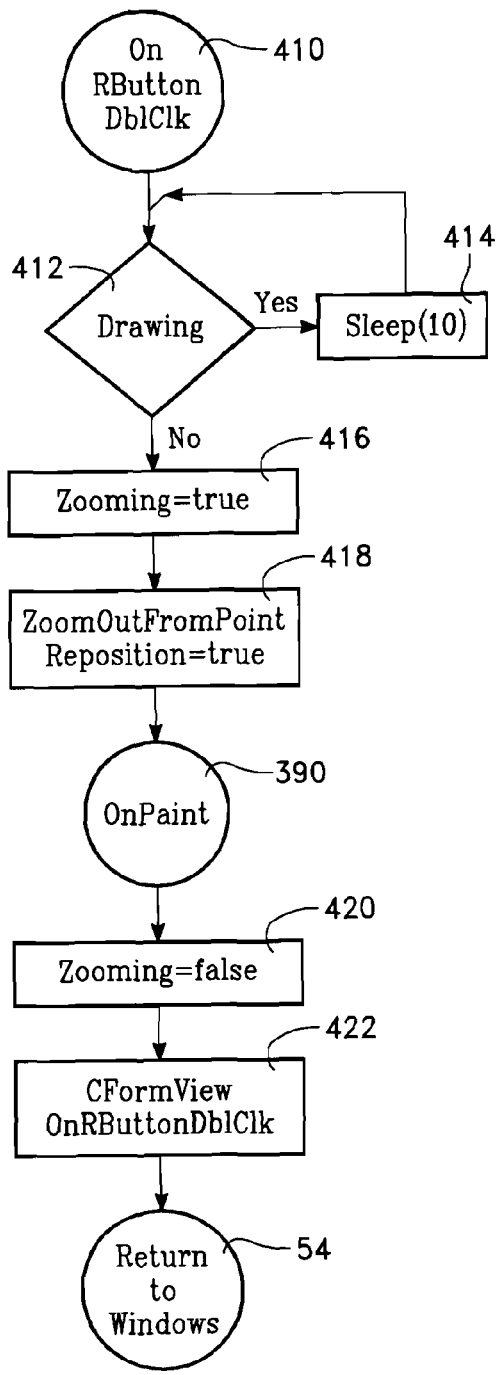
FIG. 11A is a flow chart for the On Rbutton DblClk module of the computer software program comprising the radar video data player.
Figure 11B:
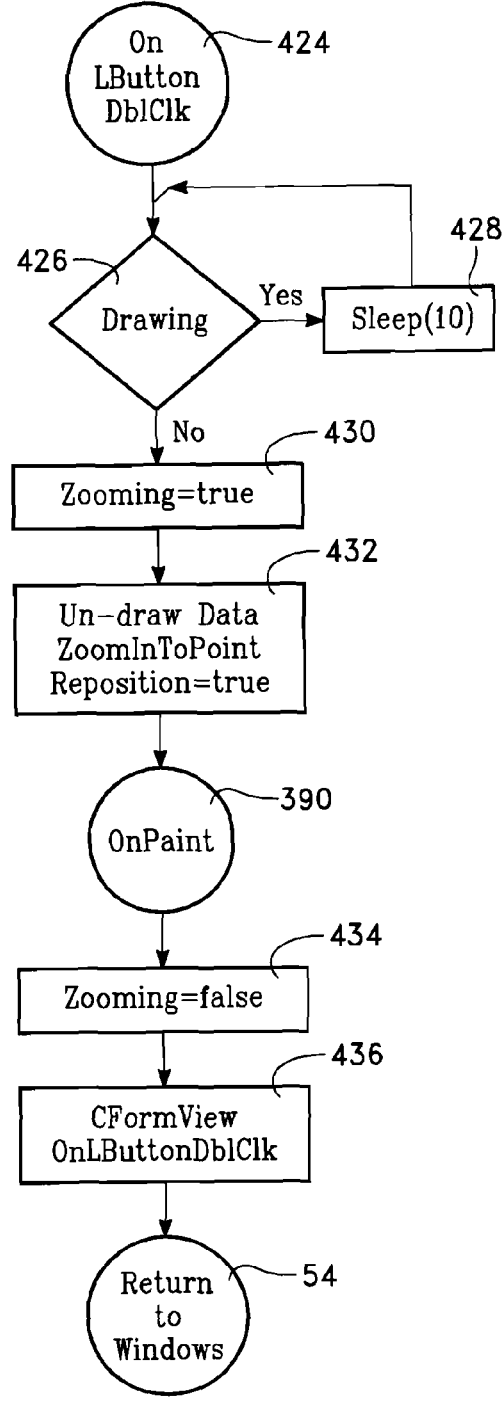
FIG. 11B is a flow chart for the On Lbutton DblClk module of the computer software program comprising the radar video data player.

Referring to FIGS. 3, 11A and 11B the On RButton DblClk routine 410 of FIG. 11A allows the user to zoom out from plot 46 and the On LButton DblClk 424 of FIG. 11B allows the user to zoom into plot 46. Initially, the radar video plot 46 displayed on the graph represents a complete or full scan of radar video data. This prevents the user from zooming out from the display of radar video data. However the user can zoom into the display of radar video data.

The On Rbutton DblClk routine 410 is called by Windows when the user double clicks on the right mouse button. Program step 412 checks to see if a plot such as plot 46 is currently being drawn on the display screen 25. When the answer is "Yes" a time period in increments of ten milliseconds is provided by program step 414 until the drawing is complete.

After the drawing is completed the software proceeds to program step 416 and sets the Zooming flag equal to true. This prevents the drawing of radar video data on the display screen 25 while the zooming function is occurring.

During program step 418 the software zooms out from the point on the plot where the mouse is pointing. For example, when the mouse points at a data point depicted by cursor arrow 44 on FIG. 3, the software will zoom out from this point. The software zooms in the X-axis but does not zoom in the Y-axis. A Reposition flag is also set equal to true during program step 418. This indicates that the radar video data plot is being repositioned.

Figure 10:
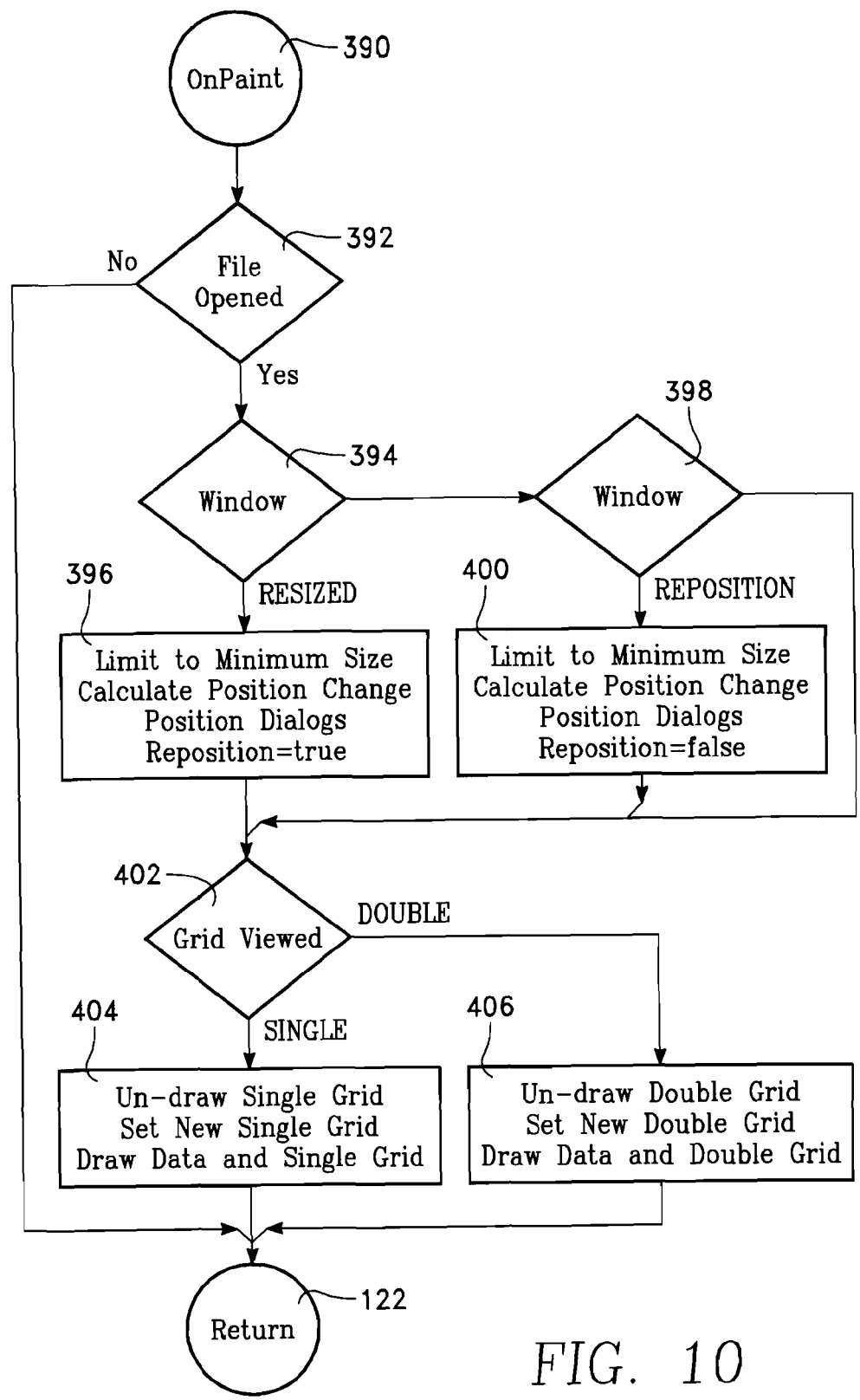
FIG. 10 is a flow chart for the OnPaint module of the computer software program comprising the radar video data player.

Program step 390 calls the OnPaint routine of FIG. 10 to insure that the entire display within display screen 25 is redrawn including the X and Y scales, the plot and the information at the bottom portion of display window 25.

Program step 420 sets the Zooming flag equal to false when the drawing is complete.

Program step 422 uses a CFormView class pointer to call the OnRbuttonDblClk routine to accommodate the remainder of the Windows function. Program steps 412, 414, 416, 418, 390, and 420 preform the drawing function shown in FIGS. 1, 2 and 3.

Referring to FIG. 11B, the On Lbutton DblClk routine 424 is called by Windows when the user double clicks on the left mouse button. Program step 426 checks to see if a plot such as plot 46 is currently being drawn on the display screen 25. When the answer is "Yes" a time period in increments of ten milliseconds is provided by program step 428 until the drawing is complete.

Program step 430 sets the Zooming flag equal to true. This prevents the display screen 25 from being over written while a zoom in is occurring. Program step 432 un-draws the radar video data on display screen 25 to prevent residual radar video data from appearing on screen 25 during the zoom in process. The software then zooms in to the point where the cursor arrow 44 is pointing.

The Reposition flag is set equal to true in program step 432. Program step 390 calls the OnPaint routine of FIG. 10 to insure that the entire display within display screen 25 is redrawn including the X and Y scales, the plot and the information at the bottom portion of display window 25. Program step 434 sets the Zooming flag equal to false when the drawing is complete.

Program step 436 uses a CFormView class pointer to call the OnLbuttonDblClk routine to accommodate the remainder of the Windows function. Program steps 426, 428, 430, 432, 390, and 434 preform the drawing function shown in FIGS. 1, 2 and 3.

Figure 12:
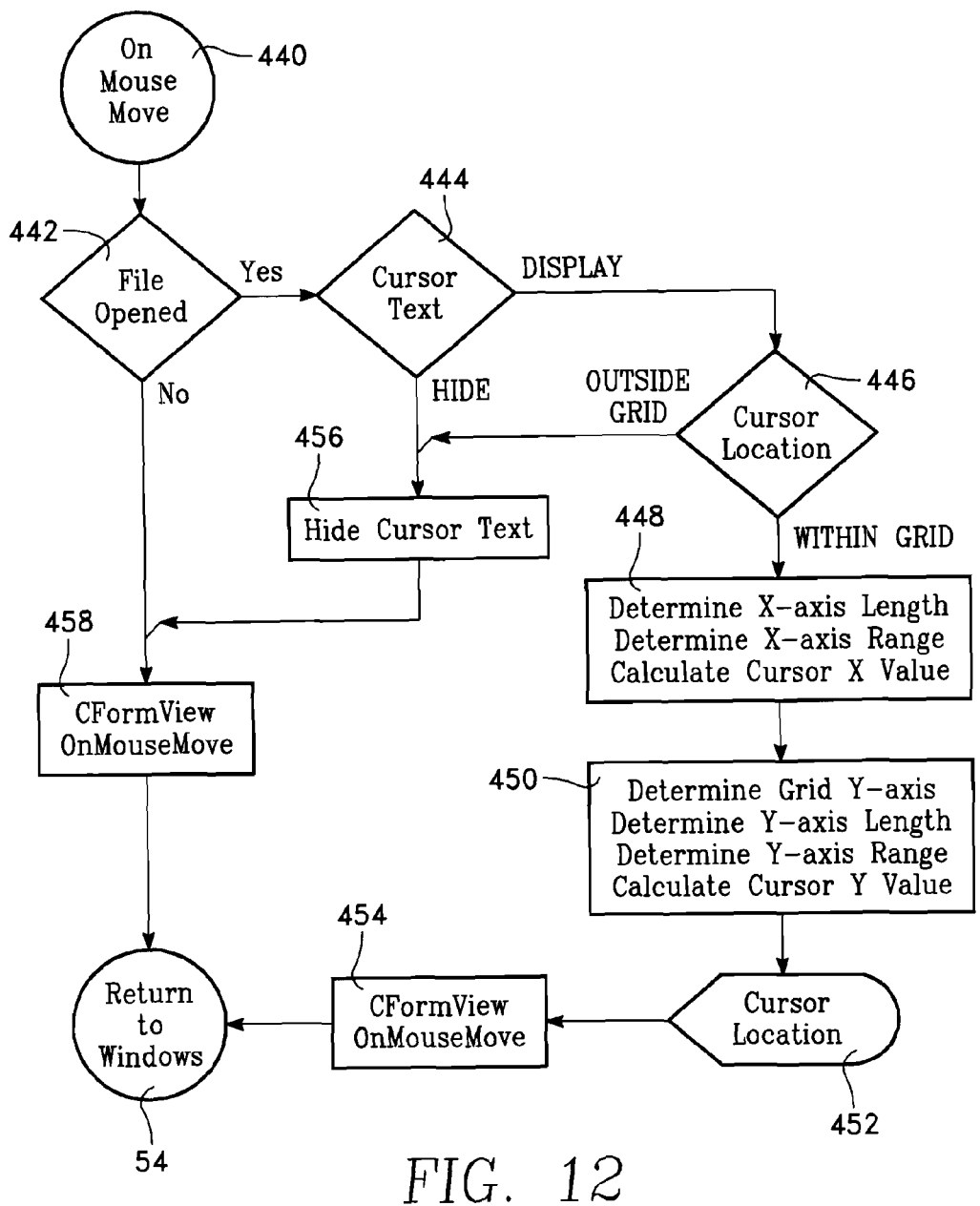
FIG. 12 is a flow chart for the On Mouse Move module of the computer software program comprising the radar video data player.

Referring to FIGS. 3 and 12, whenever the user moves the mouse within the main program window, the software enters the On Mouse Move routine 440. Program step 442 checks to see if a file is open. If the answer is "no" then radar video data is not being displayed on the display screen 25 and the software proceeds to program step 458. Program step 458 uses the CFormView class pointer to call the OnMouseMove routine to accommodate the remainder of the windows function. The software then returns to Windows (program step 54).

When a file is open, the software checks to see if cursor text is to be displayed (program step 444). When the mouse cursor 44 points to a position or location on plot 46, text may or may not be displayed. The text display for this particular point is 2.738 miles and a sample value of 44.

When cursor text is hidden, the software proceeds to program step 456 which hides the cursor text and program step 458 which calls the OnMouseMove routine prior to returning to Windows (program step 54).

When cursor text is to be displayed the software proceeds to program step 446. The text to be displayed is located within parenthesis on the display screen in the manner shown in FIG. 3. The values are selected from the options drop down menu on display screen 25. The values may include sample count which is depicted on the X-axis of plot 46, and the sample value which is depicted on the Y-axis of plot 46. Distances may also be indicated by the cursor text.

When the location of mouse cursor 44 is outside of the grid then the software proceeds to program step 456. When the location of the mouse cursor 44 is within the grid being displayed then the software proceeds to program step 448. Program step 448 determines the x-axis length which initially is 4096 pixels in length. Program step 448 also determines the x-axis range including the minimum and maximum values for the x-axis currently being displayed on display screen 25. The cursor x-axis value is then calculated based upon the position of mouse cursor 44 within the grid. The plot 46 illustrated in FIG. 3 shows the full data range of 4000 samples.

Program step 450 determines the length of the grid y-axis which initially one hundred twenty seven pixels in length. The Y-range is next determined which is from zero to one hundred twenty seven. The cursor y-axis value is then calculated based upon the position of mouse cursor 44 within the grid.

Program step 452 display location for the mouse cursor 44. Program step 454 uses the CFormView class pointer to call the OnMouseMove routine to accommodate the remainder of the Windows function. Program step 54 returns to Windows.

Referring to FIGS. 3 and 10, the OnPaint routine is entered from program step 390 in FIG. 11A and program step 390 in FIG. 11B. Program step 392 determines if a data file is open. If a data file is not open, then the software proceeds to the calling function. When a data file is open, the software proceeds to program step 394 to determine if the window needs to be resized, that is the window display 25 needs to be made larger or smaller by dragging an edge of the chart window.

Whenever the window display 25 is to be resized, program step 396 limits the minimum size of the window whenever the window is made smaller. The software also calculates the position change to the window and repositions the dialogs for the window during program step 396. Program step 396 sets a Reposition flag equal to true. This flag informs other software the x and y scales within the window have been repositioned relative to the window.

Whenever the window is to be repositioned and not resized, the software passes through program step 398 into program step 400 which repositions the window. Program step 400 limits the window to a minimum size, calculates the position change which is the position on the display screen 25 the window will appear and repositions the dialogs. Program step 400 sets the Reposition flag equal to false since the x and y scales within the window do not need to be repositioned relative to the window.

Whenever the window is not being resized or repositioned, but is being uncovered from another program that is covering the display of grid or plot 46 on display screen 25 the software proceeds to program step 402. Program step 402 test for on board recorded data shown in FIGS. 1 and 3 or telemetered data which is peak data and average data shown in FIG. 2.

Program step 404 un-draws the single grid for the recorded data, sets a new single grid and then draws the new single grid and the radar video data plot of recorded data.

Program step 406 un-draws the double grid for the telemetry data, sets a new double grid and then draws the new double grid and radar video data plots of telemetered data.

Referring to FIGS. 3 and 9A-9E, the radar video data player includes numerous cursor options. To allow the user to make various measurements with the radar video data player several cursor options were added to the program. The user has the ability to display the position of the mouse pointer arrow 44 in terms of location along the X-axis. The position may be displayed as either a sample number or distance from the radar emitter in miles, nautical miles, feet or kilometers. When the user selects one of these values, the Y-axis value of the mouse pointer is also displayed. The options for the Y-axis display are sample value, dB value or voltage value. The example shown in FIG. 3 shows the distance in miles from the emitter (seeker) and digital sample value pointed to. The values are displayed only when the mouse pointer is within the bounds of the graph or plot 46.

The radar video data player also has a single step option. Finally, the last option added to the radar video data player program is the ability to single step from one radar scan to the next scan or to the previous scan. This single step capability provides the user with the ability to analyze the behavior of the radar seeker and how the return radar signal changes from scan to scan. This single step capability is enabled by selecting Enable Single Step under the Options drop down menu on display screen 25. Once this single step capability is enabled, clicking on the left or right progress bar arrow 36 and 38 advance the display one scan forward or backward respectively.

Program step 300 enters the On Hscroll routine 300 which is called when there is movement of the slider indicator 42 on the slider control bar 40. The slider indicator 42 indicates the location of the radar video data currently being processed and displayed within the data file. Program step 302 gets the positioned for the scroll/slider indicator 42. Program 304 through 328 are a series of decisions steps which indicate the manner in which the user is manipulating the slider control bar 40.

Program step 304 occurs when there is a horizontal click on the left arrow 36 of control bar 40. Program step 306 decrements the position of scroll 42 by one moving the scroll 42 to the left on control bar 40.

Program step 308 occurs when there is a horizontal click on the right arrow 38 of control bar 40. Program step 310 increments the position of scroll 42 by one moving the scroll 42 to the right on control bar 40.

Program step 312 occurs when the user clicks on the slider control bar 40 to the left of the scroll 42 which decrements the position of the scroll 42 to the left by a value delta (program step 314). Delta is one part in one hundred parts comprising the size of the file as discussed above.

Program step 316 occurs when the user clicks on the slider control bar 40 to the right of the scroll 42 which increments the position of the scroll 42 to the right by the value delta (program step 318).

Program step 320 occurs when the scroll 42 is at the left end of the slider control bar 40. Position is then set to minimum (program step 322).

Program step 324 occurs when the scroll 42 is at the right end of the slider control bar 40. Position is then set to maximum (program step 326).

Program step 328 occurs when the user drops scroll 42 to a particular position on the slider control bar 40 using the mouse. Position is set equal to nPos (program step 330).

Program step 332 only occurs when with respect to a windows function and the software proceeds through program step 340 (CForm View OnHScroll( ) returning to Windows (program step 54).

Figure 9A:
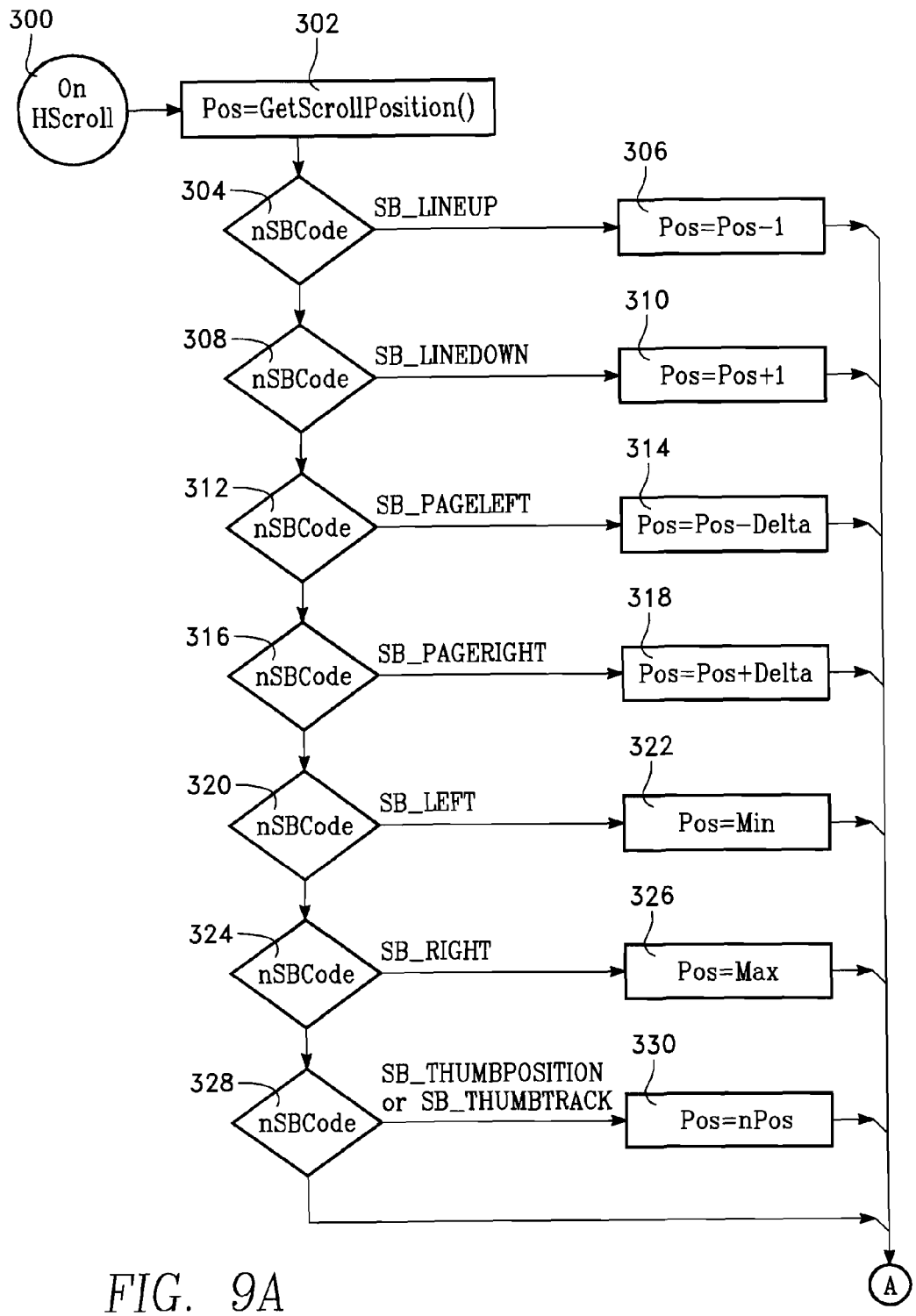
FIGS. 9A-9E illustrate a flow chart for the On HScroll module of the computer software program comprising the radar video data player.

Program step 334 sets the scroll position for scroll 42 to the position within the data file set in FIG. 9A. Program step 336 tests to see if radar video data is being played. When radar video data is being played the file pointer is set equal to the expression FileSize*Pos/Max (program step 342). This sets the file pointer to the location within the file to retrieve the new radar video data to be displayed on display screen 25.

When radar video data is not being played the software proceeds to program step 338 and sets RedrawDisplay equal to true. The software then proceeds to program step 344 to test for a single step. When the user is single stepping the slider control bar 40 proceeds to program step 346 which is single stepping to the left by one position on slider control bar 40 or program step 348 which is single stepping to the right by one position on slider control bar 40.

From program step 346 (FIG. 9B), the software proceeds to program step 350 (FIG. 9C) and tests the file extension during program step 350. When the file extension indicates that the file is a recorded data file the file pointer is checked to see it is greater than a maximum record frame size.

It should be noted that for recorded data, a frame contains video data from one radar scan. The entire file contains multiple frames of data from multiple radar scans.

When the file pointer is not greater than the maximum record frame size, the first frame of radar video data within the file is being displayed. When the file pointer is greater than the maximum record frame size the video data being displayed is somewhere else in the file. The software proceeds to program step 358 and computes the file pointer to point to the previous frame of radar video data to be displayed.

When the data is telemetered data, program step 352 checks to see if the file pointer is greater than the maximum transmit frame size which has eight subframes of radar video data. If the answer is "No" then the first frame of radar video data is being displayed and the software cannot display an earlier frame of data on display screen 25. Program step 354 backups the file pointer by the maximum transmit frame size so that the previous frame of telemetered radar video data within the file can be displayed on display screen 25.

From program step 348 (FIG. 9B), the software proceeds to program step 360 (FIG. 9C) and tests the file extension during program step 360. When the file extension indicates that the file is a recorded data file, the maximum recorded frame size is added to the file pointer which allows the user to display the next frame of recorded radar video data by clicking on the right arrow 38 on slider control bar 40 (program steps 366 and 368).

When the file extension indicates that the file is a telemetered data file, the maximum telemetered frame size is added to the file pointer which allows the user to display the next frame of transmitted radar video data by clicking on the right arrow 38 on slider control bar 40 (program steps 362 and 364).

Figure 9B:
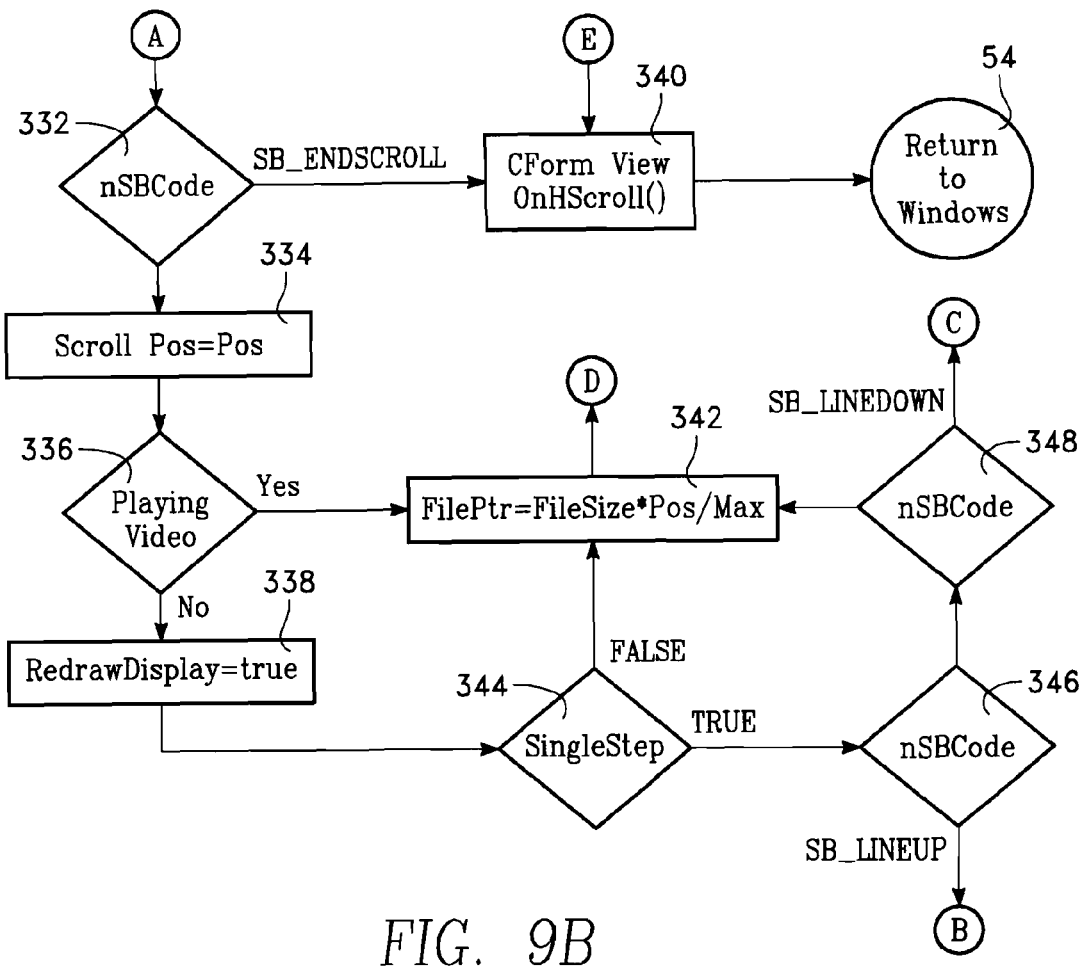
Figure 9C:
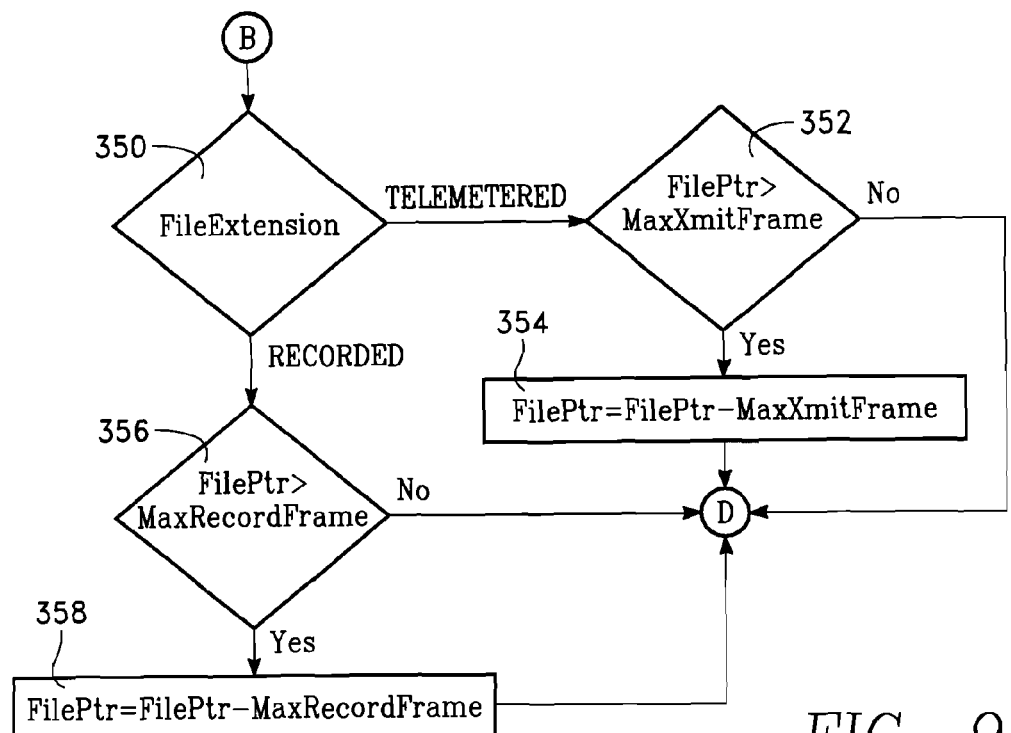
Figure 9D:
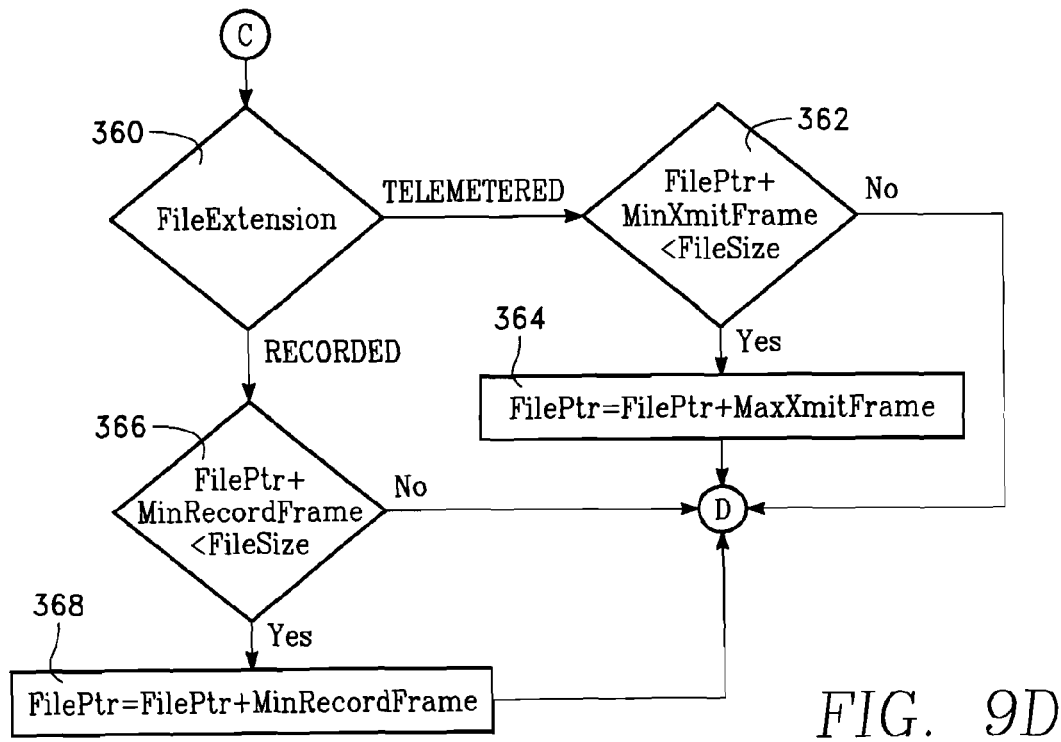
Figure 9E:
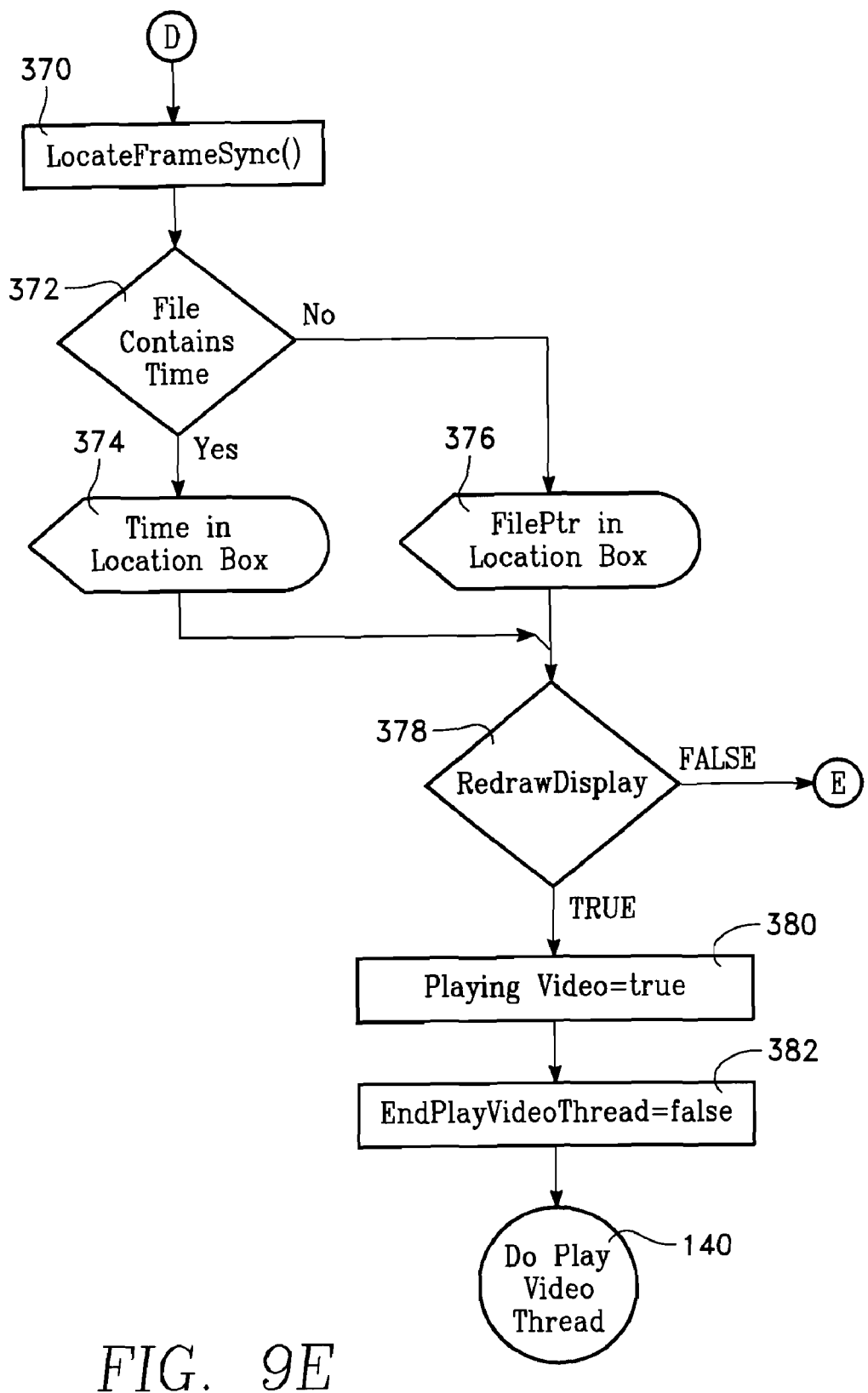

Program step 370 is entered from program step 342 of FIG. 9B or program step 352, 354, 356 or 358 of FIG. 9C or program step 362, 364, 366 or 368 of FIG. 9D. Program step 370 locates the frame sync which allows for the display of radar video data. Program step 372 determines if the file contains time. When the file contains time, the time is displayed in the location box 45 program step 374). When the file does not contain time the file pointer is displayed in the location box 45 (program step 376). This indicates where the display is located in the file.

Program step 378 tests to determine if there is a need to redraw the display. If there is a need to redraw the display (answer "TRUE"), the Playing Video flag is set equal to true (program step 380). This indicates that video is being displayed.

Program step 382 sets the EndPlayVideoThread variable equal to false. Program step 140 calls the Do Play Video Thread routine of FIG. 6A.

When Redraw Display is false the software proceeds to program step 340 of FIG. 9B which calls the windows scroll routine prior to returning to Windows.

As previously discussed, following the opening of the data file the radar video data is displayed by clicking the left mouse button with the pointer over the Play button. The Play button 32 will then change to a Stop button and the data display will begin. The Progress Slider 40 as well as the Current Location Edit Box 45 will give the user an indication of where in time or in the file the displayed data 46 is located. If the user wishes to move the slider indicator 42 to a location of interest the user simply selects and drags the slider indicator 42 to the desired location. When the slider indicator 42 is released the data will continue to play from that point on until the end of the file is reached. The user can also advance or retard the position of the slider indicator 42 in small increments by clicking on or holding down the right or left scroll buttons.

Alternatively, if the user wishes to display the data statically the user simply selects and drags the progress slider indicator 42 to the desired location of interest. The data for that location in time or in the file will be displayed until the user selects some other location of interest, clicks the Play button 32 to play the data dynamically or closes the file by either closing the program or opening another file. FIG. 3 shows the display of a sample test pattern of radar video data 46 used to evaluate the functionality of the Radar Video Telemeter.

It should be noted that the X-axis scales for the radar video data on FIGS. 1, 2 and 3 are labeled to show the sample location within a radar scan. The Y-axis scale of the radar video data is labeled to cover the range of the values of the 7-bit data. Likewise, the Y-axis scale of the Detection Gate data is labeled from zero to one to cover the range of values of that 1-bit data.

When the Radar Video Data Player program is first started the size of the displayed window is set to its minimum size. This is done to accommodate low resolution video displays. The user will most likely want to enlarge the window. This can be done by clicking on the maximize button 29 in the upper right of the window. It can also be done by selecting the bottom, right or bottom right corner of the window and dragging it to the desired size. As this is operation is performed, the graphs 20 and 22 and their contents are redrawn and the position of the controls (play button 32 and progress slider/slider control bar 34) and the text edit boxes 43, 45 and 47 are maintained in the bottom center portion of the window display 25. Whenever the window is resized or positioned the OnPaint( ) routine 390 of FIG. 10 is called to redraw the window contents.

It should also be noted that the user has the ability to zoom into a particular point up to six times providing the user with the ability to discern individual data samples. If the user attempts to zoom in or out too far a message is displayed informing the user that the limit is reached.

Another option added to the radar video data player program was the ability to single step from one radar scan to the next or to the previous scan. This capability provides the user with the ability to analyze the behavior of the radar seeker and how the return radar signal changes from scan to scan. This feature is enabled by selecting Enable Single Step under the Options drop down menu. Once enabled clicking on the right or left Progress bar arrow will advance the display one scan forward or backward respectively.

What is claimed is:

1. A radar video data viewing system comprising:
   (a) a display screen for viewing multiple scans of radar video data which is generated by a seeker over a time period of four minutes to twenty minutes, wherein said multiple scans of radar video data appear on at least one graph on said display screen which allows a user to view said graph in a viewing mode which emulates real time, said multiple scans of radar video data comprising a data file having a file size of approximately four gigabytes to approximately twenty gigabytes of radar video data, said graph including:
      (i) a first horizontal axis having a numerical range of approximately 0 to 4096, wherein said horizontal axis represents a numerical range of radar video data samples for said multiple scans of radar video data being plotted on said graph;
      (ii) a first vertical axis positioned at the left end of said graph, said first vertical axis having a numerical range of approximately 0 to 127, said first vertical axis representing an amplitude for the radar video data samples being plotted on said graph;
      (iii) a second horizontal axis and a second vertical axis positioned below said first horizontal axis and said first vertical axis on said display screen, wherein said second vertical axis is positioned at the left end of said graph and has a numerical value of zero to one representing at least one detection gate plot for said multiple scans of radar video data;
   (b) a plurality of controls appearing above said graph and below said graph on said display screen for allowing said user to manipulate views of said multiple scans of radar video data appearing on said display screen and to select each of the scans of radar video data from said data file which are to appear on said display screen;
   (c) a plurality of text boxes appearing on said display screen below said graph, said plurality of text boxes providing an indication of a current location within the data file of the radar video data samples currently being displayed on said display screen, a start location for the data file being currently displayed on said display screen and an end location for the data file being currently displayed on said display screen; and
   (d) a computer software program for controlling, handling and interpreting the scans of radar video data within said data file being plotted on said graph and detection gate data for said detection gate plot, wherein said computer software program, responsive to a selection by said user of the scans of radar video data to be displayed on said display screen, plots the scans of radar video data on said display screen and plots the detection gate data on said display screen.

2. The radar video data viewing system of claim 1 wherein said scans of radar video data being displayed on said display screen are from recorded video data generated by said seeker.

3. The radar video data viewing system of claim 1 wherein said plurality of controls include:
   (a) a play button located below said graph on said display screen, said play button when engaged by said user initiating a playing of the scans of radar video data within said data file selected by said user for display on said display screen; and
   (b) a slider control bar located below said graph on said display screen, said slider control bar having a slider indicator which is movable in a forward direction or a reverse direction within said slider control bar wherein said user engages said slider control bar to control playback of said scans of radar video data in either said forward direction or said reverse direction which allows said user to view said scans of radar video data.

4. The radar video data viewing system of claim 3 wherein said plurality of text boxes include a start location text box positioned below said slider control bar on said display screen, a current location text box positioned below said slider control bar on said display screen to the right of said start location text box, and an end location text box positioned below said slider control bar on said display screen to the right of said current location text box.

5. The radar video data viewing system of claim 1 wherein a plurality of frames of radar video data are contained within said data file, each of said plurality of frames of radar video data within said data file including a frame sync which occurs prior to a first radar video data sample within said frame of radar video data wherein each of said plurality of frames of radar video data contains one scan of radar video data.

6. The radar video data viewing system of claim 5 wherein recorded radar video data generated by said seeker which comprises scans of radar video data being displayed on said display screen includes time data inserted in each frame of radar video data immediately following the frame sync for each frame of radar video data wherein said time data is displayed in said plurality of text boxes appearing on said display screen including a start time, a current time and end time.

7. The radar video data viewing system of claim 4 wherein recorded radar video data generated by said seeker which excludes time data is displayed in said start location text box, said current location text box and said end location text box respectively as the start location for the data file currently displayed on said display screen, the end location for the data file currently displayed on said display screen, and the current location for the data file currently displayed on said display screen.

8. The radar video data viewing system of claim 5 further comprising a title bar located across an upper portion of said display screen above said graph, said title bar having an options drop down menu which includes a single step option, said single step option when enabled by said user allowing said user to step through each frame of said data file in either said forward direction or said reverse direction one frame at a time providing said user with a capability of viewing each frame of radar video data within said data file.

9. The radar video data viewing system of claim 8 further comprising a first slider control arrow located at one end of a slider control bar positioned below said graph on said display screen and a second slider control arrow located at the other end of said slider control bar wherein said user advances a playback of said frames of radar video data in either said forward direction or said reverse direction by engaging said first and second slider control arrows.

10. The radar video data viewing system of claim 1 wherein said computer software program includes a zooming utility for providing said user with a capability to zoom into a user selected sample location on said graph, said user positioning a mouse cursor arrow on the selected sample location on said graph allowing said user to zoom into said selected sample location, said user having said capability to zoom into said selected sample location a maximum of six times providing said user with the ability to examine each of said radar video data samples on said graph.

11. The radar video data viewing system of claim 1 wherein each of said radar video data samples has x-axis units on said first horizontal axis of miles, feet, or kilometers which are selected by said user and y-axis units on said first vertical axis of discrete values, decibels or volts which are selected by said user.

12. A radar video data viewing system comprising:
(a) a display screen for viewing multiple scans of radar video data which is generated by a seeker over a time period of four minutes to twenty minutes, said scans of radar video data being displayed on said display screen are from recorded video data generated by said seeker, wherein said multiple scans of radar video data appear on at least one graph on said display screen which allows a user to view said graph in a viewing mode which emulates real time, said multiple scans of radar video data comprising a data file having a file size of approximately four gigabytes to approximately twenty gigabytes of radar video data, said graph including:
  (i) a first horizontal axis having a numerical range of approximately 0 to 4096, wherein said horizontal axis represents a numerical range of radar video data samples for said multiple scans of radar video data being plotted on said graph;
  (ii) a first vertical axis positioned at the left end of said graph, said first vertical axis having a numerical range of approximately 0 to 127, said first vertical axis representing an amplitude for the radar video data samples being plotted on said graph;
  (iii) a second horizontal axis and a second vertical axis positioned below said first horizontal axis and said first vertical axis on said display screen, wherein said second vertical axis is positioned at the left end of said graph and has a numerical value of zero to one representing at least one detection gate plot for said multiple scans of radar video data;
(b) a plurality of controls appearing above said graph and below said graph on said display screen for allowing said user to manipulate views of said multiple scans of radar video data appearing on said display screen and to select each of the scans of radar video data from said data file which are to appear on said display screen;
(c) a plurality of text boxes appearing on said display screen below said graph, said plurality of text boxes providing an indication of a current location within the data file of the radar video data samples currently being displayed on said display screen, a start location for the data file being currently displayed on said display screen and an end location for the data file being currently displayed on said display screen;
(d) a computer software program for controlling, handling and interpreting the scans of radar video data within said data file being plotted on said graph and detection gate data for said detection gate plot, wherein said computer software program, responsive to a selection by said user of the scans of radar video data to be displayed on said display screen, plots the scans of radar video data on said display screen and plots the detection gate data on said display screen;
(e) a plurality of frames of radar video data contained within said data file, each of said plurality of frames of radar video data contained within said data file including a frame sync which occurs prior to a first radar video data sample within said frame of radar video data wherein each of said plurality of frames of radar video data contains one scan of radar video data;
(f) a title bar located across an upper portion of said display screen above said graph, said title bar having an options drop down menu which includes a single step option, said single step option when enabled by said user allowing said user to step through each frame of said data file in either a forward direction or a reverse direction one frame at a time providing said user with a capability of viewing each frame of radar video data within said data file;
(g) a play button located below said graph on said display screen, said play button when engaged by said user initiating a playing of the scans of radar video data within said data file selected by said user for display on said display screen;
(h) a slider control bar located below said graph on said display screen, said slider control bar having a slider indicator which is movable in said forward direction or said reverse direction within said slider control bar wherein said user engages said slider control bar to control playback of said scans of radar video data in either said forward direction or said reverse direction which allows said user to view said scans of radar video data; and
(i) a first slider control arrow located at one end of a slider control bar and a second slider control arrow located at the other end of said slider control bar wherein said user advances a playback of said frames of radar video data in either said forward direction or said reverse direction by engaging said first and second slider control arrows.

13. The radar video data viewing system of claim 12 wherein said plurality of text boxes include a start location text box positioned below said slider control bar on said display screen, a current location text box positioned below said slider control bar on said display screen to the right of said start location text box, and an end location text box positioned below said slider control bar on said display screen to the right of said current location text box.

14. The radar video data viewing system of claim 12 wherein recorded radar video data generated by said seeker which comprises scans of radar video data being displayed on said display screen includes time data inserted in each frame of radar video data immediately following the frame sync for each frame of radar video data wherein said time data is displayed in said plurality of text boxes appearing on said display screen including a start current, a current time and end time.

15. The radar video data viewing system of claim 12 wherein recorded radar video data generated by said seeker which comprises scans of radar video data being displayed on said display screen includes time data inserted in each frame of radar video data immediately following the frame sync for each frame of radar video data wherein said time data is displayed in said plurality of text boxes appearing on said display screen including a start time, a current time and end time.

16. The radar video data viewing system of claim 12 wherein recorded radar video data generated by said seeker which excludes time data is displayed in said start location text box, said current location text box and said end location text box respectively as the start location for the data file currently displayed on said display screen, the end location for the data file currently displayed on said display screen, and the current location for the data file currently displayed on said display screen.

17. The radar video data viewing system of claim 12 wherein said computer software program includes a zooming utility for providing said user with a capability to zoom into a user selected sample location on said graph, said user positioning a mouse cursor arrow on the selected sample location on said graph allowing said user to zoom into said selected sample location, said user having said capability to zoom into said selected sample location a maximum of six times providing said user with the ability to examine each of said radar video data samples on said graph.

18. The radar video data viewing system of claim 12 wherein each of said radar video data samples has x-axis units on said first horizontal axis of miles, feet, or kilometers which are selected by said user and y-axis units on said first vertical axis of discrete values, decibels or volts which are selected by said user.

19. A radar video data viewing system comprising:
   (a) a display screen for viewing multiple scans of radar video data which is generated by a seeker over a time period of four minutes to twenty minutes, said scans of radar video data being displayed on said display screen are from recorded video data generated by said seeker, wherein said multiple scans of radar video data appear on first and second graphs on said display screen which allows a user to view said first and second graphs in a viewing mode which emulates real time, said multiple scans of radar video data comprising a data file having a file size of approximately four gigabytes to approximately twenty gigabytes of radar video data, said first and second graphs including:
      (i) first and second horizontal axis each having numerical range of approximately 0 to 4096, wherein said first and second horizontal axis represent a numerical range of radar video data samples for said multiple scans of radar video data being plotted on said pair of graphs;
      (ii) first and second vertical axis positioned respectively at the left end of said first and second horizontal axis, said first and second vertical axis having a numerical range of approximately 0 to 127, said first and second vertical axis representing an amplitude for the radar video data samples being plotted on said pair of graphs;
      (iii) a third horizontal axis and a third vertical axis positioned below said first horizontal axis and said first vertical axis on said display screen, wherein said third vertical axis is positioned at the left end of said third horizontal axis and has a numerical value of zero to one representing a first detection gate grid for said multiple scans of radar video data;
      (iv) a fourth horizontal axis and a fourth vertical axis positioned below said second horizontal axis and said second vertical axis on said display screen, wherein said fourth vertical axis is positioned at the left end of said fourth horizontal axis and has said numerical value of zero to one representing a second detection gate grid for said multiple scans of radar video data;
      (v) said pair of graphs being generated from a telemeter file which comprises telemetered radar video data provided by said seeker, said pair of graphs representing a peak video grid and an average video grid;
   (b) a plurality of controls appearing above said pair of graphs and below said pair of graphs on said display screen for allowing said user to manipulate views of said multiple scans of radar video data appearing on said display screen and to select each of the scans of radar video data from said data file which are to appear on said display screen;
   (c) a plurality of text boxes appearing on said display screen below said pair of graphs, said plurality of text boxes providing an indication of a current location within the data file of the radar video data samples currently being displayed on said display screen, a start location for the data file being currently displayed on said display screen and an end location for the data file being currently displayed on said display screen;
   (d) a computer software program for controlling, handling and interpreting the scans of radar video data within said data file being plotted on said pair of graphs and detection gate data for said first and second detection gate grids, wherein said computer software program, responsive to a selection by said user of the scans of radar video data to be displayed on said display screen, plots the scans of radar video data on said display screen and plots the detection gate data on said display screen;
   (e) a plurality of frames of radar video data contained within said data file, each of said plurality of frames of radar video data contained within said data file including a frame sync which occurs prior to a first radar video data sample within said frame of radar video data wherein each of said plurality of frames of radar video data contains one scan of radar video data;
   (f) a title bar located across an upper portion of said display screen above said graph, said title bar having an options drop down menu which includes a single step option, said single step option when enabled by said user allowing said user to step through each frame of said data file in either a forward direction or a reverse direction one frame at a time providing said user with a capability of viewing each frame of radar video data within said data file;
   (g) a play button located below said graph on said display screen, said play button when engaged by said user initiating a playing of the scans of radar video data within said data file selected by said user for display on said display screen;
   (h) a slider control bar located below said graph on said display screen, said slider control bar having a slider indicator which is movable in said forward direction or said reverse direction within said slider control bar wherein said user engages said slider control bar to control playback of said scans of radar video data in either said forward direction or said reverse direction which allows said user to view said scans of radar video data; and
   (i) a first slider control arrow located at one end of a slider control bar and a second slider control arrow located at the other end of said slider control bar wherein said user advances a playback of said frames of radar video data in either said forward direction or said reverse direction by engaging said first and second slider control arrows.

20. The radar video data system of claim 19 wherein said computer software program includes a zooming utility for providing said user with a capability to zoom into a user selected sample location on each of said pair of graphs, said user positioning a mouse cursor arrow on the selected sample location on each of said pair of graphs allowing said user to zoom into said selected sample location, said user having said capability to zoom into said selected sample location a maximum of six times providing said user with the ability to examine each of said radar video data samples on each of said pair of graphs.

* * * * *